United States Patent
Kumar Agrawal

(10) Patent No.: US 11,909,544 B1
(45) Date of Patent: *Feb. 20, 2024

(54) ELECTRONIC DEVICES AND CORRESPONDING METHODS FOR REDIRECTING USER INTERFACE CONTROLS DURING A VIDEOCONFERENCE

(71) Applicant: Motorola Mobility LLC, Chicago, IL (US)

(72) Inventor: Amit Kumar Agrawal, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/949,118

(22) Filed: Sep. 20, 2022

(51) Int. Cl.
| | |
|---|---|
| *G06F 3/01* | (2006.01) |
| *H04W 4/02* | (2018.01) |
| *H04L 12/18* | (2006.01) |
| *G06F 1/16* | (2006.01) |
| *G04G 21/08* | (2010.01) |
| *G06V 40/16* | (2022.01) |

(52) U.S. Cl.
CPC ......... *H04L 12/1831* (2013.01); *G04G 21/08* (2013.01); *G06F 1/163* (2013.01); *G06F 3/017* (2013.01); *G06V 40/161* (2022.01); *H04W 4/023* (2013.01)

(58) Field of Classification Search
None
See application file for complete search history.

(56) References Cited

U.S. PATENT DOCUMENTS

| | | | |
|---|---|---|---|
| 9,618,970 B2* | 4/2017 | Lee | .......................... G06F 1/163 |
| 2015/0113553 A1* | 4/2015 | Pan | .................. H04N 21/41407 |
| | | | 725/32 |
| 2019/0289192 A1* | 9/2019 | Lei | ........................ H04N 23/631 |
| 2022/0391161 A1* | 12/2022 | Fan | ........................ G06F 3/1423 |
| 2023/0052490 A1* | 2/2023 | Chaudhri | ............ G06F 3/04842 |
| 2023/0057544 A1* | 2/2023 | Seigneurbieux | ........ H04L 65/80 |

OTHER PUBLICATIONS

"No Film Crew Needed", Motorola YouTube Video; Published Mar. 25, 2021; https://www.youtube.com/watch?v=1SQ9yH e-TGo.
Hollister, Sean , "Apple explains how it's making your iPhone a full-fledged webcam for your Mac", Article on TheVerge.com; published online Jun. 7, 2022 at https://www.theverge.com/2022/6/7/23158510/apple-continuity-cam-work-any-app-zoom-desk-mod e-api.
Motorola, , "New Ready For platform unleashes the power of moto g100", Published online Mar. 25, 2021 at https://us.motorola.com/blog/ready-for-g100.

\* cited by examiner

*Primary Examiner* — Joshua Joo
(74) *Attorney, Agent, or Firm* — Philip H. Burrus, IV

(57) ABSTRACT

A method for an electronic device includes detecting, by one or more processors, the electronic device engaging in a video recording session while electronically in communication with both a companion electronic device operating as a primary display for the electronic device and a smartwatch. In response, the method redirects one or more video recording session controls to a user interface of the smartwatch when user interaction with the one or more video recording session controls at a user interface of the electronic device will at least partially obscure depictions of a subject of the video recording session in one or more video recording session images captured by an image capture device of the electronic device.

20 Claims, 15 Drawing Sheets

ELECTRONIC DEVICES AND CORRESPONDING METHODS FOR REDIRECTING USER INTERFACE CONTROLS DURING A VIDEOCONFERENCE

BACKGROUND

Technical Field

This disclosure relates generally to electronic devices, and more particularly to electronic devices with wireless communication capabilities.

Background Art

Many modern electronic devices, including smartphones, tablet computers, and laptop computers, are equipped to engage in videoconferences with other electronic devices across a network. Users frequently employ such devices to communicate with friends, family, and work colleagues in real-time discussions, as well as to share electronic content.

Some electronic devices are equipped with a content redirection feature that allows content to stream through a portable electronic device, such as a smartphone, and then to be redirected to another device having a larger display. While this makes participants of a videoconference easier to see, it can cause problems with user interface control access. This issue can arise in other applications as well, one example of which is a video recording application. It would be advantageous to have improved electronic devices, methods, and systems that reduce or eliminate this issue in the applications in which it arises.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
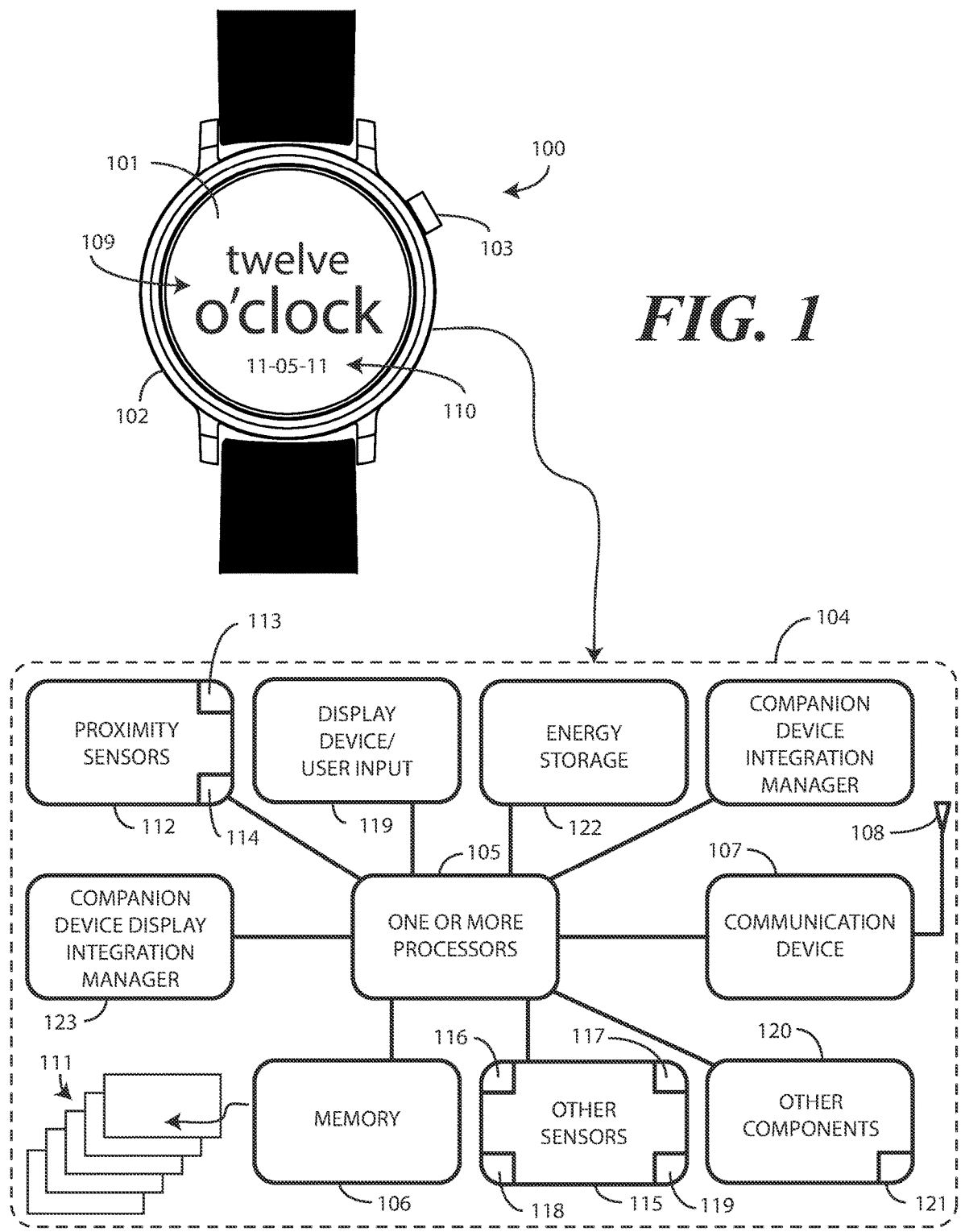
FIG. 1 illustrates one explanatory companion electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to redirecting one or more user interface controls operable at a user interface of an electronic device to a wearable companion device in response to determining both that a content presentation companion device is operating as a primary display for the electronic device and an image capture device of the electronic device is capturing one or more images of a participant engaged in an application, examples of which include a videoconference application, a video recording application, or other similar application. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of dynamically redirecting one or more videoconference user interface controls, or alternatively one or more video recording user interface controls, operable at a user interface of an electronic device to a user interface of a wearable electronic device when an image capture device of the electronic device is capturing one or more images of a participant during an application, examples of which include a videoconference operation or a video recording application. The non-processor circuits may include, but are not limited to, a display, a radio receiver, a radio transmitter, signal drivers, clock circuits, power source circuits, and user input devices. As such, these functions may be interpreted as steps of a method to perform the redirection of videoconference user interface controls or video recording user interface controls from an electronic device to a wearable electronic device.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a companion electronic device that is operable with a primary electronic device. In one or more embodiments, the companion electronic device comprises a wearable electronic device, examples of which include a watch, bracelet, necklace, pendant, or other type of wearable electronic device.

In one or more embodiments, in addition to being operable with the companion electronic device, the electronic device is also operable with a content presentation companion device. In one or more embodiments, one or more processors of the electronic device can redirect content to the content presentation companion device so that the content presentation companion device can serve as a primary display for the electronic device. Illustrating by example, if the content presentation companion device comprises a television monitor and the electronic device comprises a smartphone, in one or more embodiments one or more processors of the smartphone can redirect video from a videoconference or video recording session to the television monitor so that a user can enjoy this content on a wider screen.

Embodiments of the disclosure contemplate that in such videoconference or video recording applications, the smartphone may be connected to the television monitor by a wire and may even be across the room from the person. This makes the user interface of the smartphone difficult to access in the event the user wants to change the settings of the videoconference or video recording. Moreover, since the smartphone is likely the only electronic device with an image capture device, it will frequently be the case that the smartphone is capturing images of the user during the videoconference or video recording session. Even if the content presentation companion device has an imager, the image capture devices included with modern smartphones are so advanced that it will frequently be the case that the user prefers to use the smartphone as the primary camera for the videoconference or video recording. Accordingly, if the user "reaches" for the smartphone to access the user interface controls while the image capture device is capturing images, they will disrupt the image capture operation due to the fact that their hand will likely obscure their face as it approaches the smartphone. This can become irritating to other participants and may even break the rhythm of the videoconference or video recording session.

Embodiments of the disclosure solve this problem by redirecting user interface controls for the videoconference or video recording to the companion electronic device under certain conditions. In one or more embodiments, one or more processors of an electronic device determine that the electronic device is operating in coordination with both a content presentation companion device and a companion electronic device. In one or more embodiments, when this condition is determined, and it is further determined that the electronic device is engaged in a videoconference or video recording session with an image capture device of the electronic device capturing images of a participant and the content presentation companion device operating as a primary display for the electronic device, one or more processors of the electronic device transfer the user interface controls of the electronic device to the companion electronic device to avoid user interactions from disrupting the one or more images being captured by the electronic device.

Thus, in one or more embodiments a method comprises detecting, with one or more processors of an electronic device that is electronically in communication with both a content presentation companion device operating as a primary display for the electronic device and a companion electronic device, one example of which is a wearable companion device, redirect one or more user interface controls operable at the user interface of the electronic device to a user interface of the companion electronic device. In one or more embodiments, the one or more processors of the electronic device perform this redirection while the content presentation companion device is operating as the primary display for the electronic device during either a videoconference or video recording session and an image capture device of the electronic device is capturing one or more images of a participant in the videoconference or video recording session.

Thereafter, when the participant engages with the user interface controls at the companion electronic device, the one or more processors of the electronic device can receive one or more videoconference or video recording session signals from the companion electronic device and use those signals to control the videoconference or video recording session. Thus, if the companion electronic device is a wearable electronic device such as a smartwatch, and a user touches user interaction targets defining the user interface controls at the display of the smartwatch to initiate transfer of the videoconference or video recording session signals from the smartwatch to the electronic device, the one or more processors of the electronic device can use those signals to control the videoconference or video recording session just as if they had been engaged at the user interface of the electronic device itself. This allows the participant of the videoconference or video recording session by engaging the smartwatch rather than the electronic device, which means that the images being captured by the electronic device remain uninterrupted or unobstructed by a hand or other object approaching the electronic device itself.

In one or more embodiments, an electronic device comprises a communication device electronically communicating with both a content presentation companion device operating as a primary display for the electronic device and a wearable electronic device during a videoconference or video recording session. The electronic device also includes an image capture device capturing one or more images of a participant of the videoconference. In one or more embodiments, the one or more processors of the electronic device dynamically redirect one or more videoconference or video recording controls operable at a user interface of the electronic device to a user interface of the wearable electronic device while the image capture device is capturing the one or more images of the participant of a videoconference. Advantageously, this allows the participant to control the videoconference or video recording using the wearable electronic device, and without obstructing the field of view of the image capture device.

Turning now to FIG. 1, illustrated therein is one explanatory companion electronic device configured in accordance with one or more embodiments of the disclosure. In this illustrative example, the companion electronic device is a wearable electronic device and is shown as a smartwatch 100. However, as will be described below with reference to FIG. 4, the companion electronic device could take many other forms as well. In other embodiments, the companion electronic device is configured as a bracelet, a neckband, a pendant, or as a configurable wearable electronic device that can be switched between, for example, a pendant configuration and a watch configuration or other configuration.

This illustrative smartwatch 100 includes a display 101, which may optionally be touch-sensitive. In one embodiment where the display 101 is touch-sensitive, the display 101 can serve as a primary user interface of the smartwatch 100. Users can deliver user input to the display 101 of such an embodiment by delivering touch input from a finger, stylus, or other objects disposed proximately with the display.

The explanatory smartwatch 100 of FIG. 1 also includes a watch casing 102. In one or more embodiments, the watch casing 102 is manufactured from a rigid material such as a rigid thermoplastic material, aluminum, steel, or another metal. Still other constructs will be obvious to those of ordinary skill in the art having the benefit of this disclosure.

The watch casing 102 can be formed from a single housing member or from multiple housing members. For example, the watch casing can include a front housing member disposed about the periphery of the display 101 and a rear-housing member defining the backside of the smartwatch 100. In other embodiments, the watch casing 102 can simply be disposed about perimeter of a smartwatch module that is inserted into watch casing 102. Features can be incorporated into the watch casing 102. Examples of such features include an optional speaker port, microphone port, or electrical connector to which a charger may be coupled. Alternatively, a user interface component, such as the control button 103 shown in FIG. 1, can be disposed along the watch casing 102.

A block diagram schematic 104 of the smartwatch 100 is also shown in FIG. 1. In one embodiment, the smartwatch 100 includes one or more processors 105. The one or more processors 105 can be a single processor in one or more embodiments. Alternatively, the one or more processors 105 can include an application processor and, optionally, one or more auxiliary processors. Moreover, one or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the smartwatch 100. Each of the application processor and the auxiliary processor(s) can be configured to process and execute executable software code to perform the various functions of the smartwatch 100. In one embodiment, the auxiliary processor will be configured to perform fewer functions, and thus consume less power from an energy storage device 122, than does the application processor. A storage device, such as memory 106, can optionally store the executable software code used by the one or more processors 105 during operation.

In this illustrative embodiment, the smartwatch 100 also includes a communication device 107 that can be configured for wired or wireless communication with one or more other devices or networks. The networks can include a wide area network, a local area network, and/or personal area network. In one or more embodiments, the communication device 107 utilizes wireless technology for communication in peer-to-peer or ad hoc communications such as HomeRF, Bluetooth, IEEE 802.11, or other forms of wireless communication such as infrared technology. The communication device 107 can include wireless communication circuitry, one of a receiver, a transmitter, or transceiver, and one or more antennas 108.

In one or more embodiments, the communication device 107 operates in conjunction with the one or more processors 105 to electronically communicate through a communication network. For example, in one embodiment, the communication device 107 can be configured to communicate through a traditional cellular network. Other examples of networks with which the communication circuit may communicate include proprietary networks and direct communication networks. In other embodiments, the communication device 107 can communicate with near field or local area networks, infrared communication circuits, magnetic field modulation circuits, and Wi-Fi circuits. In one or more embodiments, the communication device 107 can be configured to provide messaging functionality to deliver electronic messages to remote devices.

In one embodiment, the one or more processors 105 can be responsible for performing the primary functions of the smartwatch 100. For example, in one embodiment the one or more processors 105 comprise one or more circuits operable with one or more user interface devices, which can include the display 101, to present presentation information, such as the time of day 109 or date 110, to a user.

The executable software code used by the one or more processors 105 can be configured as one or more modules 111 that are operable with the one or more processors 105. Such modules 111 can store instructions, control algorithms, logic steps, and so forth. In one embodiment, the one or more processors 105 are responsible for running the operating system environment. The operating system environment can include a kernel and one or more drivers, and an application service layer, and an application layer. The operating system environment can be configured as executable code operating on one or more processors or control circuits of the smartwatch 100.

The application layer can be responsible for executing application service modules. The application service modules may support one or more functions or applications or "apps." Examples of such applications shown in FIG. 1 include a time-of-day application that presents the time of day 109 and/or date 110 on the display 101. Other explanatory applications or functions will be described below with reference to FIGS. 9-11. Still other functions or applications will be obvious to one of ordinary skill in the art having the benefit of this disclosure. The applications of the application layer can be configured as clients of the application service layer to communicate with services through application program interfaces (APIs), messages, events, or other interprocess communication interfaces. Where auxiliary processors are used, they can be used to execute input/output functions, actuate user feedback devices, and so forth.

In one embodiment, one or more proximity sensors 112 can be operable with the one or more processors 105. In one embodiment, the one or more proximity sensors 112 include one or more proximity sensor components 113. The proximity sensors 112 can also include one or more proximity detector components 114. In one embodiment, the proximity sensor components 113 comprise only signal receivers. By contrast, the proximity detector components 114 include a signal receiver and a corresponding signal transmitter.

While each proximity detector component can be any one of various types of proximity sensors, such as but not limited to, capacitive, magnetic, inductive, optical/photoelectric, imager, laser, acoustic/sonic, radar-based, Doppler-based, thermal, and radiation-based proximity sensors, in one or more embodiments the proximity detector components comprise infrared transmitters and receivers. The infrared transmitters are configured, in one embodiment, to transmit infrared signals having wavelengths of about 860 nanometers, which is one to two orders of magnitude shorter than the wavelengths received by the proximity sensor components. The proximity detector components can have signal receivers that receive similar wavelengths, i.e., about 860 nanometers.

In one or more embodiments the proximity sensor components have a longer detection range than do the proximity detector components due to the fact that the proximity sensor components detect heat directly emanating from a person's body (as opposed to reflecting off the person's body) while the proximity detector components rely upon reflections of infrared light emitted from the signal transmitter. For example, the proximity sensor component may be able to detect a person's body heat from a distance of about ten feet, while the signal receiver of the proximity detector component may only be able to detect reflected signals from the transmitter at a distance of about one to two feet.

In one embodiment, the proximity sensor component 113 comprises an infrared signal receiver so as to be able to detect infrared emissions from a person. Accordingly, the proximity sensor component 113 requires no transmitter since objects disposed external to the housing deliver emissions that are received by the infrared receiver. As no transmitter is required, each proximity sensor component 113 can operate at a very low power level.

In one embodiment, one or more proximity detector components 114 can each include a signal receiver and a corresponding signal transmitter. The signal transmitter can transmit a beam of infrared light that reflects from a nearby object and is received by a corresponding signal receiver. The proximity detector components 114 can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals. The reflected signals can also be used to receive user input from a user delivering touch or gesture input to the smartwatch 100.

One or more other sensors 115 included in the smartwatch 100 may include a microphone 116 (or multiple microphones), a speaker 117, and an image capture device 118. The microphone 116 can be included as an audio capture device. These audio capture devices can be operable with the one or more processors 105 to receive voice input. Additionally, in one or more embodiments the audio capture devices can capture ambient audio noise. Signals corresponding to captured audio can be transmitted to an electronic device in communication with the smartwatch 100 or a server or cloud-computing device. The other sensors 115 can additionally include loudspeakers such as speaker 117 for delivering audio content to a user wearing the smartwatch 100.

The one or more other sensors 115 may also include key selection sensors, a touch pad sensor, a touch screen sensor, a capacitive touch sensor, and one or more switches. Touch sensors 119 may be used to indicate whether any of the user actuation targets present on the display 101 are being actuated. Alternatively, touch sensors 119 disposed in the watch casing 102 can be used to determine whether the smartwatch 100 is being touched at side edges or major faces of the smartwatch 100. The touch sensors 119 can include surface and/or housing capacitive sensors in one embodiment.

The other sensors 115 can be optionally include a global positioning system device for determining where the smartwatch 100 is located. The global positioning system device can communicate with a constellation of earth orbiting satellites or a network of terrestrial base stations to determine an approximate location. While a global positioning system device is one example of a location determination module, it will be clear to those of ordinary skill in the art having the benefit of this disclosure that other location determination devices, such as electronic compasses or gyroscopes, could be used as well.

The other components 120 of the smartwatch 100 can also include motion detectors 121. For example, an accelerometer may be embedded in the electronic circuitry of the smartwatch 100 to show vertical orientation, constant tilt and/or whether the smartwatch 100 is stationary. The measurement of tilt relative to gravity is referred to as "static acceleration," while the measurement of motion and/or vibration is referred to as "dynamic acceleration." A gyroscope can be used in a similar fashion.

Regardless of the type of motion detectors 121 that are used, in one embodiment the motion detectors 121 are also operable to detect movement, and direction of movement, of the smartwatch 100 by a user. In one or more embodiments, the other sensors 115 and the motion detectors 121 can each be used to detect motion corresponding to a user's body or to human motion. This information can be used to determine that the smartwatch 100 is being worn on a user's wrist, for example, as well as to detect gesture movement for gesture-based control operation.

Illustrating by example, in one embodiment when the smartwatch 100 is being worn on a wrist, the motion detectors 121 can be used to detect predefined motions corresponding to human motion. These predefined motions can be small, and can include vibration, shaking, breathing, micromotions, and so forth. For instance, if the user is walking, the motion detectors 121 can detect this movement by detecting motion of the user's wrist. The one or more processors 105 can then extract parametric data from electronic signals delivered by these motion detectors 121 in response to the user walking. By comparing the parametric data to a reference file stored in memory 106, the one or more processors 105 can identify the walking motion as corresponding to the motion of the user's body. The one or more processors 105 can use this information to distinguish the smartwatch 100 being actively worn on a wrist, for example, as opposed to being placed along a flat surface such as a nightstand or dresser top. The motion detectors 121 can be used to detect other movement of the smartwatch 100 as well. For example, in some embodiments a user can deliver gesture input by moving a hand or arm in predefined motions when the smartwatch 100 is being worn on a wrist.

Many of the sensors in the smartwatch 100 can be used to detect movement, gestures, or other user input. For example, the one or more proximity sensors 112 can detect the gesture of a user waving a hand above the display 101. In another embodiment, an accelerometer of the motion detectors 121 can detect gesture input from a user lifting, shaking, or otherwise deliberately moving the smartwatch 100. In yet other embodiments, the user can deliver gesture input by rotating or changing the orientation of the smartwatch 100, which can be detected by multiple accelerometers or a gyroscope. Examples of this will be illustrated in more detail below with reference to FIG. 11. It should be clear to those of ordinary skill in the art having the benefit of this disclosure that additional sensors can be included with the other sensors 115 shown in FIG. 1.

Other components 120 operable with the one or more processors 105 can include output components such as video outputs, audio outputs, and/or mechanical outputs. Examples of output components include audio outputs, or other alarms and/or buzzers and/or a mechanical output component such as vibrating or motion-based mechanisms. Still other components will be obvious to those of ordinary skill in the art having the benefit of this disclosure.

The other components 120 can also include a motion generation device for providing haptic notifications or vibration notifications to a user. For example, a piezoelectric transducer, rotational motor, or other electromechanical device can be configured to impart a force or vibration upon the wrist of a wearer through the watch casing 102. The motion generation device can provide a thump, bump, vibration, or other physical sensation to the user. The one or more processors 105 can be configured to actuate the motion generation device to deliver a tactile or vibration output alone or in combination with other outputs such as audible outputs.

An energy storage device 122, such as a rechargeable battery, super capacitor, or fuel cell, can be included in the smartwatch 100 to power its various components. Where a rechargeable battery is used as the energy storage device 122, this battery can include a lithium-ion cell or a nickel metal hydride cell. In one embodiment, the battery is a lithium polymer cell, as such cells having reasonably large energy density, wide operating temperature range, offer large number of charging cycles, and provide long useful life. The energy storage device 122 may also include overvoltage and overcurrent protection and charging circuitry. In one embodiment, the energy storage device 122 is a 350 milli-Amp-hour lithium polymer cell.

In one or more embodiments, the smartwatch 100 includes a companion device display integration manager 123. When another device transmits user interface controls, signals, or other information to the smartwatch 100, the companion device display integration manager 123 delivers that information to the one or more processors 105 for presentation to the user. Illustrating by example, when user interface controls are redirected from an electronic device to the smartwatch 100, the one or more processors 105 can present those user interface controls on the display 101. This will be illustrated in more detail below with reference to FIGS. 9 and 10.

It is to be understood that FIG. 1 is provided for illustrative purposes only and for illustrating components of one smartwatch 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Figure 2:
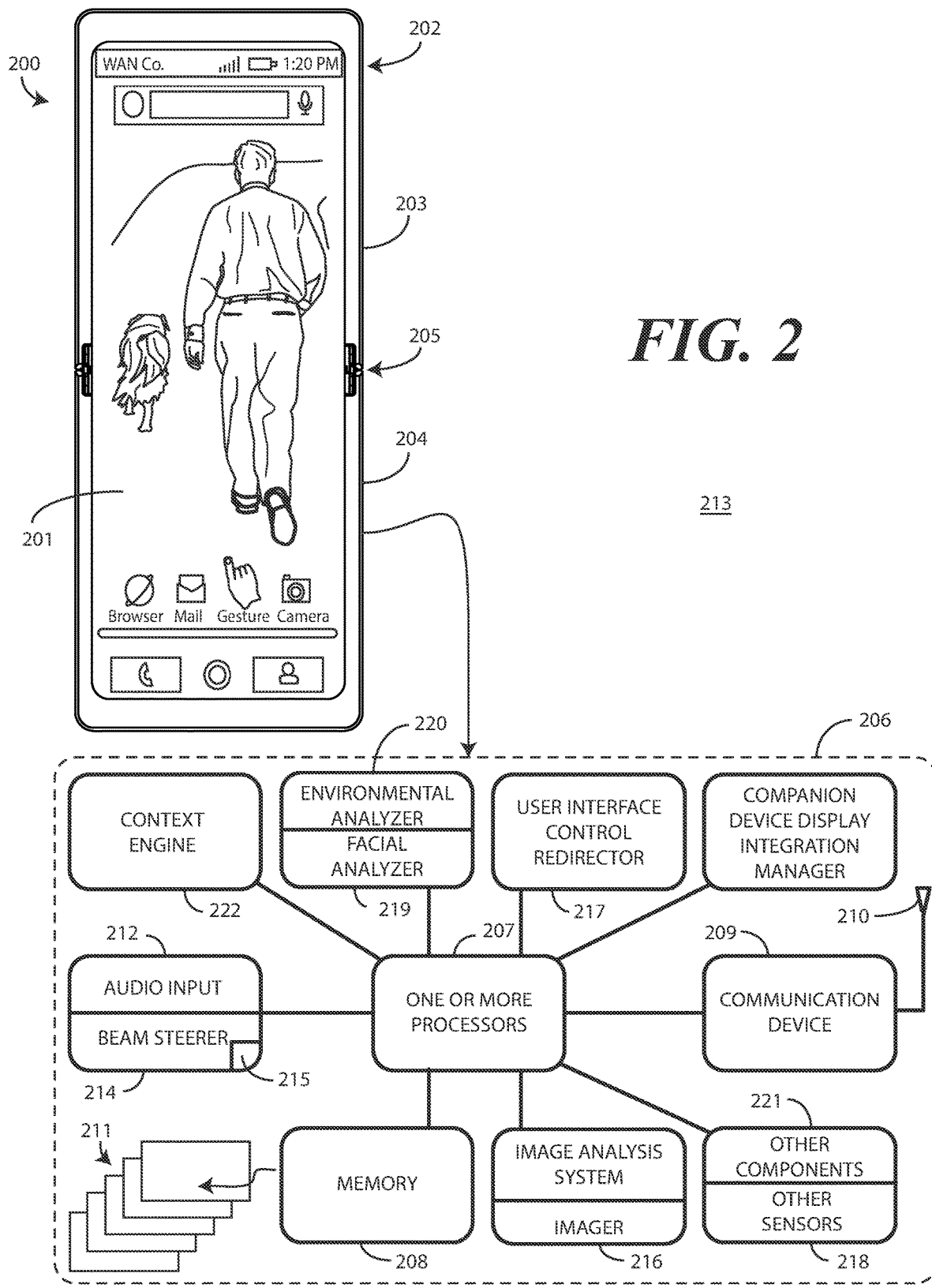
FIG. 2 illustrates one explanatory electronic device in accordance with one or more embodiments of the disclosure.

The smartwatch 100 of FIG. 1 can operate as a standalone electronic device in one or more embodiments. However, in other embodiments, the smartwatch 100 can operate in tandem with another electronic device, via wireless electronic communication using the communication device 107 or via a wired connection channel. Turning now to FIG. 2, illustrated therein is one such electronic device 200.

The electronic device 200 of FIG. 2 is a portable electronic device and is shown as a smartphone for illustrative purposes. However, it should be obvious to those of ordinary skill in the art having the benefit of this disclosure that other electronic devices may be substituted for the explanatory smart phone of FIG. 2. For example, the electronic device 200 could equally be a conventional desktop computer, palm-top computer, a tablet computer, a gaming device, a media player, or other device.

This illustrative electronic device 200 includes a display 201, which may optionally be touch-sensitive. Users can deliver user input to the display 201, which serves as a user interface for the electronic device 200. In one embodiment, users can deliver user input to the display 201 of such an embodiment by delivering touch input from a finger, stylus, or other objects disposed proximately with the display 201. In one embodiment, the display 201 is configured as an active-matrix organic light emitting diode (AMOLED) display. However, it should be noted that other types of displays, including liquid crystal displays, would be obvious to those of ordinary skill in the art having the benefit of this disclosure.

The explanatory electronic device 200 of FIG. 2 also includes a device housing 202. In one embodiment, the device housing 202 includes two housing members, namely, a first device housing 203 that is coupled to a second device housing 204 by a hinge 205 such that the first device housing 203 is pivotable about the hinge 205 relative to the second device housing 204 between a closed position and an axially displaced open position. In other embodiments, the device housing 202 will be rigid and will include no hinge. In still other embodiments, the device housing 202 will be manufactured from a flexible material such that it can be bent and deformed. Where the device housing 202 is manufactured from a flexible material or where the device housing 202 includes a hinge, the display 201 can be manufactured on a flexible substrate such that it bends. In one or more embodiments, the display 201 is configured as a flexible display that is coupled to the first device housing 203 and the second device housing 204, spanning the hinge 205. Features can be incorporated into the device housing 202, including control devices, connectors, and so forth.

Also shown in FIG. 2 is an explanatory block diagram schematic 206 of the explanatory electronic device 200. In one or more embodiments, the block diagram schematic 206 is configured as a printed circuit board assembly disposed within the device housing 202 of the electronic device 200. Various components can be electrically coupled together by electrical conductors or a bus disposed along one or more printed circuit boards.

The illustrative block diagram schematic 206 of FIG. 2 includes many different components. Embodiments of the disclosure contemplate that the number and arrangement of such components can change depending on the particular use case or application. Examples of such applications relevant to the methods described below include a videoconference application and a video recording application. Accordingly, electronic devices configured in accordance with embodiments of the disclosure can include some components that are not shown in FIG. 2, and other components that are shown may not be needed and can therefore be omitted.

In one embodiment, the electronic device 200 includes one or more processors 207. In one embodiment, the one or more processors 207 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device. The application processor and the auxiliary processor(s) can be operable with the various components of the block diagram schematic 206. Each of the application processor and the auxiliary processor(s) can be configured to process and execute executable software code to perform the various functions of the electronic device with which the block diagram schematic 206 operates. A storage device, such as memory 208, can optionally store the executable software code used by the one or more processors 207 during operation.

In this illustrative embodiment, the block diagram schematic 206 also includes a communication device 209 that can be configured for wired or wireless communication with one or more other devices or networks. The networks can include a wide area network, a local area network, and/or personal area network. The communication device 209 may also utilize wireless technology for communication, such as, but are not limited to, peer-to-peer or ad hoc communications such as HomeRF, Bluetooth and IEEE 802.11, and other forms of wireless communication such as infrared technology. The communication device 209 can include wireless communication circuitry, one of a receiver, a transmitter, or transceiver, and one or more antennas 210.

In one embodiment, the one or more processors 207 can be responsible for performing the primary functions of the electronic device with which the block diagram schematic 206 is operational. For example, in one embodiment the one or more processors 207 comprise one or more circuits operable with the display 201 to present presentation information to a user. The executable software code used by the one or more processors 207 can be configured as one or more modules 211 that are operable with the one or more processors 207. Such modules 211 can store instructions, control algorithms, and so forth.

In one or more embodiments, the block diagram schematic 206 includes an audio input/processor 212. The audio input/processor 212 is operable to receive audio input from an environment 213 about the electronic device 200. The audio input/processor 212 can include hardware, executable code, and speech monitor executable code in one embodiment. The audio input/processor 212 can be operable with one or more predefined identification references stored in memory 208. With reference to audio input, the predefined identification references can comprise representations of basic speech models, representations of trained speech models, or other representations of predefined audio sequences that are used by the audio input/processor 212 to receive and identify voice commands that are received with audio input captured by an audio capture device. In one embodiment, the audio input/processor 212 can include a voice recognition engine. Regardless of the specific implementation utilized in the various embodiments, the audio input/processor 212 can access various speech models stored with the predefined identification references to identify speech commands, languages being spoken, and other information.

The audio input/processor 212 can include a beam steering engine 214 comprising one or more microphones 215. Input from the one or more microphones 215 can be processed in the beam steering engine 214 such that the one or more microphones define a virtual microphone. This virtual microphone can define an acoustic reception cone that can be virtually "steered" around the electronic device 200. Alternatively, actual steering can occur as well, such as switching between a left and right microphone or a front and back microphone or switching various microphones ON and OFF individually. In one or more embodiments, two or more microphones 215 can be included for selective beam steering by the beam steering engine 214.

Illustrating by example, a first microphone can be located on a first side of the electronic device 200 for receiving audio input from a first direction, while a second microphone can be placed on a second side of the electronic device 200 for receiving audio input from a second direction. These microphones can be "steered" by selectively turning them ON and OFF.

The beam steering engine 214 can then select between the first microphone and the second microphone to beam steer audio reception toward an object, such as a user delivering audio input. This beam steering can be responsive to input from other sensors, such as imagers, facial depth scanners, thermal sensors, or other sensors. For example, an image capture device 216 can estimate a location of a person's face and deliver signals to the beam steering engine 214 alerting it in which direction to focus the acoustic reception cone and/or steer the first microphone and the second microphone, thereby adding confirmation to audio steering and saving time. Where multiple people are around the electronic device 200, this steering advantageously directs a beam reception cone toward a particular person so that languages spoken, language preferences, and other information about the person's speech can be ascertained.

Alternatively, the beam steering engine 214 processes and combines the signals from two or more microphones to perform beam steering. The one or more microphones 215 can be used for voice commands and/or for language recognition. In response to control of the one or more microphones 215 by the beam steering engine 214, a user location direction can be determined. The beam steering engine 214 can then select between the first microphone and the second microphone to beam steer audio reception toward the user. Alternatively, the audio input/processor 212 can employ a weighted combination of the microphones to beam steer audio reception toward the user.

The one or more processors 207 can perform filtering operations on audio input received by the audio input/processor 212. For example, in one embodiment the one or more processors 207 can filter the audio input into identifiable audio input, i.e., first audio input, and other audio input that is not identifiable, i.e., second audio input.

Various sensors 218 can be operable with the one or more processors 207. One example of a sensor that can be included with the various sensors 218 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 207, to detect an object in close proximity with—or touching—the surface of the display 201 or the device housing 202 of the electronic device 200 by establishing electric field lines between pairs of capacitive sensors and then detecting perturbations of those field lines.

Another example of a sensor that can be included with the various sensors 218 is a geo-locator that serves as a location detector. In one embodiment, location detector is able to determine location data when authenticating a user. Location can be determined by capturing the location data from a constellation of one or more earth orbiting satellites, or from a network of terrestrial base stations to determine an approximate location. The location detector may also be able to determine location by locating or triangulating terrestrial base stations of a traditional cellular network, or from other local area networks, such as Wi-Fi networks.

Another example of a sensor that can be included with the various sensors 218 is an orientation detector operable to determine an orientation and/or movement of the electronic device 200 in three-dimensional space. Illustrating by example, the orientation detector can include an accelerometer, gyroscopes, or other device to detect device orientation and/or motion of the electronic device 200. Using an accelerometer as an example, an accelerometer can be included to detect motion of the electronic device. Additionally, the accelerometer can be used to sense some of the gestures of the user, such as one talking with their hands, running, or walking.

The orientation detector can determine the spatial orientation of an electronic device 200 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 200.

In one or more embodiments, the electronic device 200 includes an image capture device 216. In one embodiment, the image capture device 216 comprises a two-dimensional imager configured to receive at least one image of a person within an environment of the electronic device 200. In one embodiment, the image capture device 216 comprises a two-dimensional red-green-blue (RGB) imager. In another embodiment, the image capture device 216 comprises an infrared imager. Other types of imagers suitable for use as the image capture device 216 will be obvious to those of ordinary skill in the art having the benefit of this disclosure.

The electronic device 200 can include a face analyzer 219 and an environmental analyzer 220. The face analyzer 219 and/or environmental analyzer 220 can be configured to process an image or depth scan of an object and determine whether the object matches predetermined criteria by comparing the image or depth scan to one or more predefined identification references stored in memory 208.

For example, the face analyzer 219 and/or environmental analyzer 220 can operate as an identification module configured with optical and/or spatial recognition to identify objects using image recognition, character recognition, visual recognition, facial recognition, color recognition, shape recognition, and the like. Advantageously, the face analyzer 219 and/or environmental analyzer 220 can be used as a facial recognition device to determine the identity of one or more persons detected within the environment 213 of the electronic device 200.

The face analyzer 219 can include an image/gaze detection-processing engine as well. The image/gaze detection-processing engine can process information to detect a user's gaze point. Electronic signals can then be delivered from the image capture device 216 for computing the direction of user's gaze in three-dimensional space. The image/gaze detection-processing engine can further be configured to detect a gaze cone corresponding to the detected gaze direction, which is a field of view within which the user may easily see without diverting their eyes or head from the detected gaze direction. The image/gaze detection-processing engine can be configured to alternately estimate gaze direction by inputting images representing a photograph of a selected area near or around the eyes. It can also be valuable to determine if the user wants to be authenticated by looking directly at device. The image/gaze detection-processing engine can determine not only a gazing cone but also if an eye is looking in a particular direction to confirm user intent to be authenticated.

Other components 221 operable with the one or more processors 207 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 221 can also include proximity sensors. The proximity sensors fall in to one of two camps: active proximity sensors and "passive" proximity sensors. Either the proximity detector components or the proximity sensor components can be generally used for gesture control and other user interface protocols.

The other components 221 can optionally include a barometer operable to sense changes in air pressure due to elevation changes or differing pressures of the electronic device 200. The other components 221 can also optionally include a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 200. Similarly, a temperature sensor can be configured to monitor temperature about an electronic device.

A context engine 222 can then be operable with the various sensors to detect, infer, capture, and otherwise determine persons and actions that are occurring in an environment about the electronic device 200. For example, where included one embodiment of the context engine 222 determines assessed contexts and frameworks using adjustable algorithms of context assessment employing information, data, and events. These assessments may be learned through repetitive data analysis. Alternatively, a user may employ a menu or user controls via the display 201 to enter various parameters, constructs, rules, and/or paradigms that instruct or otherwise guide the context engine 222 in detecting multi-modal social cues, emotional states, moods, and other contextual information. The context engine 222 can comprise an artificial neural network or other similar technology in one or more embodiments.

In one or more embodiments, the context engine 222 is operable with the one or more processors 207. In some embodiments, the one or more processors 207 can control the context engine 222. In other embodiments, the context engine 222 can operate independently, delivering information gleaned from detecting multi-modal social cues, emotional states, moods, and other contextual information to the one or more processors 207. The context engine 222 can receive data from the various sensors. In one or more embodiments, the one or more processors 207 are configured to perform the operations of the context engine 222.

In one or more embodiments, the electronic device 200 includes a user interface controls redirector 217. Working with the other components, the user interface controls redirector 217 can dynamically redirect one or more videoconference or video recording controls operable at a user interface of the electronic device 200, one example of which is the display 201, to a user interface of a wearable electronic device, one example of which is the smartwatch (100) of FIG. 1 under certain conditions. In one or more embodiments, these conditions require that the electronic device 200 be electronically in communication with the wearable electronic device and also electronically in communication with a content presentation companion device, one example of which will be described below with reference to FIG. 3. In one or more embodiments, these conditions also require that the image capture device 216 of the electronic device 200 is capturing one or more images of a participant in either a videoconference or in a video recording session. In one or more embodiments, when each of these conditions is met, the one or more processors 207 of the electronic device dynamically redirect one or more videoconference or video recording session controls that would be operable at the user interface of the electronic device to the user interface of the companion electronic device.

Figure 3:
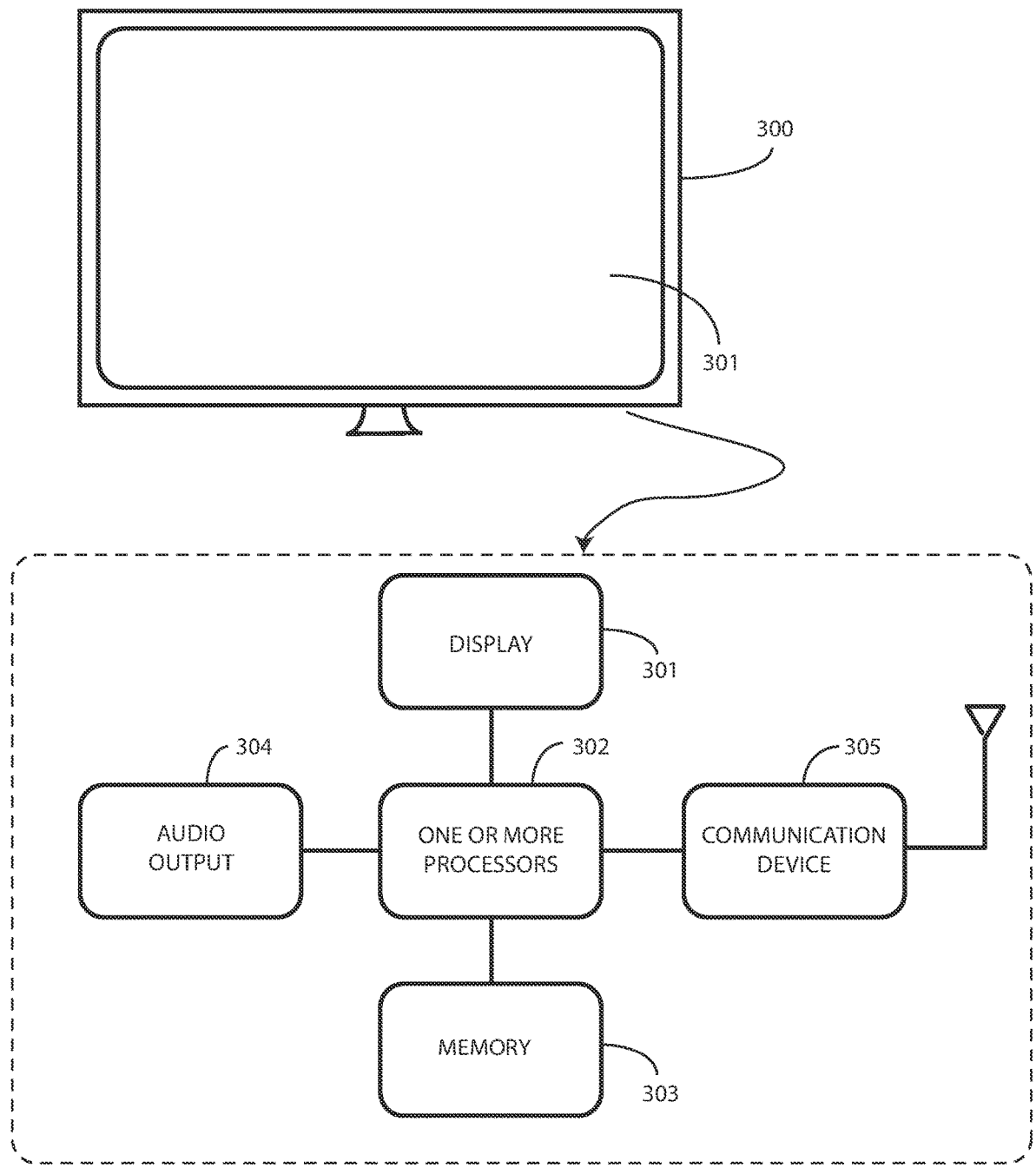
FIG. 3 illustrates one explanatory content presentation companion device in accordance with one or more embodiments of the disclosure.

Turning now to FIG. 3, illustrated therein is one explanatory content presentation companion device 300 in accordance with one or more embodiments of the disclosure. In this illustrative embodiment, the content presentation companion device 300 comprises a color video monitor. In other embodiments, the content presentation companion device 300 can take other forms. Illustrating by example, the content presentation companion device 300 can be a television, a computer display, a laptop display, a tablet computer, or a projector projecting content onto a screen. Other examples of content presentation companion devices 300 will be obvious to those of ordinary skill in the art having the benefit of this disclosure. Regardless of configuration, in one or more embodiments the content presentation companion device 300 includes one or more processors 302, a display 301, a memory 303, an audio output 304, and a communication device 305 capable of wired or wireless communication with an electronic device such as the electronic device (200) of FIG. 2.

In one or more embodiments, when coupled by either a wireless or wired connection to such an electronic device (200), the content presentation companion device 300 can function as a primary display for the electronic device (200). The electronic device (200) can receive content from a terrestrial broadcast network, cable television network, Internet streaming service, or combinations thereof, and redirect this content to the content presentation companion device 300 since its display 301 is larger than the display (201) of the electronic device (200). This allows people within the environment of the electronic device (200) or content presentation companion device 300 to see the content more easily. In one or more embodiments, content flows from the electronic device (200) to the content presentation companion device 300 through the communication device 305.

Figure 4:
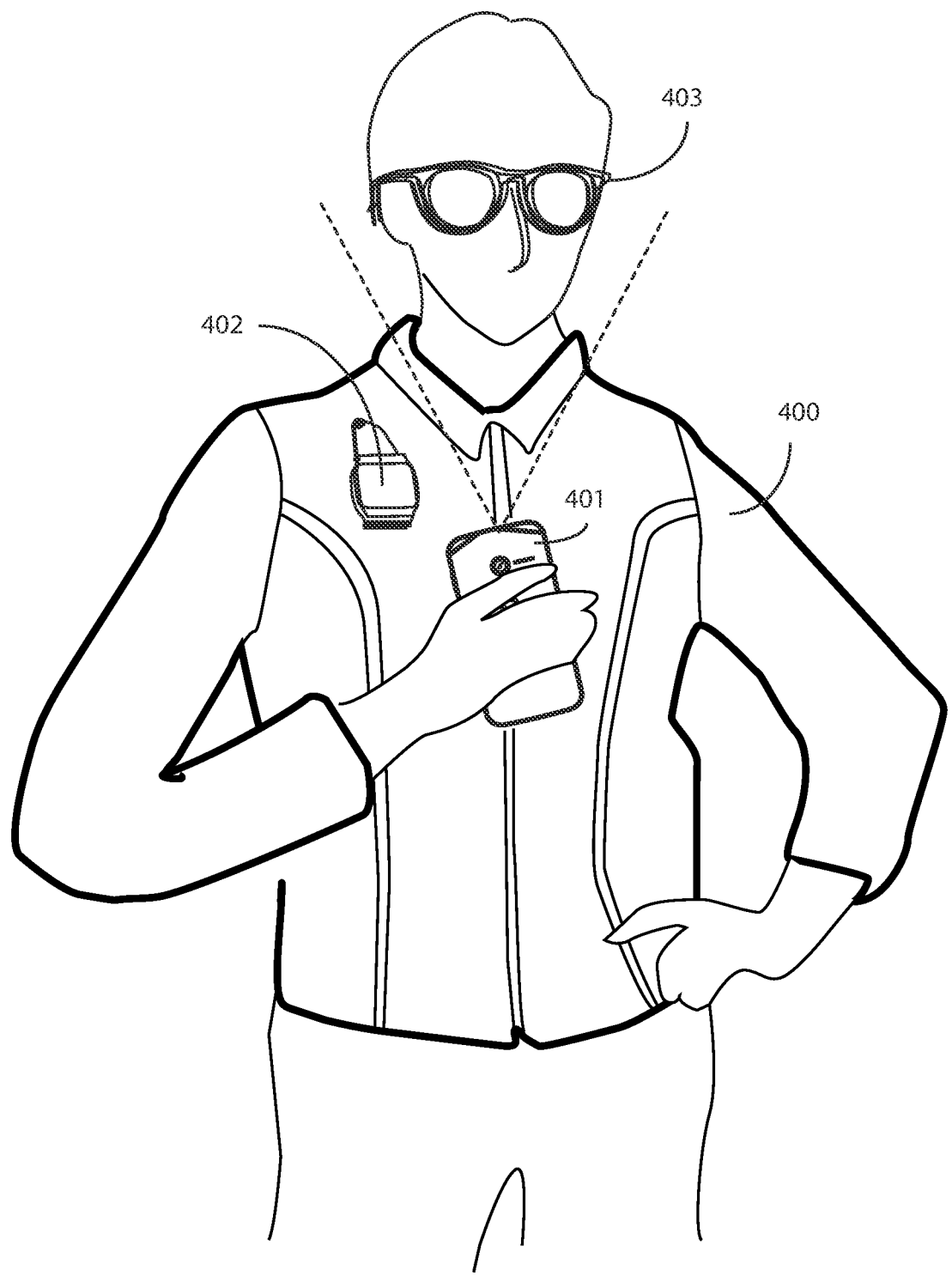
FIG. 4 illustrates another explanatory companion electronic device in accordance with one or more embodiments of the disclosure.

Turning now to FIG. 4, illustrated therein is a user 400 using an electronic device 401 with alternate companion electronic devices. In this illustrative embodiment, the user 400 is actually using two different companion electronic devices, namely, a wearable electronic device 402 and smart glasses 403. As shown in FIG. 4, the wearable electronic device 402 includes a housing and one or more straps. The one or more straps allow the wearable electronic device 402 to be worn around a wrist as a watch or folded over and clipped to a garment like a pendant as shown in FIG. 4. The wearable electronic device 402 can then include components similar to those described above with reference to the smartwatch (100) of FIG. 1 so as to function as a companion electronic device to the electronic device 401.

The smart glasses 403 include a frame and one or more stems. One or more lenses can be disposed within the frame. The lenses can be prescription or non-prescription, and can be clear, tinted, or dark. In one or more embodiments the stems are pivotable from a first position where they are situated adjacent to, and parallel with, the frame, to a second, radially displaced open position. However, in other embodiments the stems may be fixed relative to the frame. In still other embodiments, such as might be the case if the smart glasses 403 were configured as goggles, the stems may be flexible or soft. For example, the stems of goggles are frequently elasticized fabric, which is soft, flexible, pliable, and stretchy. Other types of stems will be obvious to those of ordinary skill in the art having the benefit of this disclosure. The smart glasses 403 could be configured in any number of other ways as well. Illustrating by example, the smart glasses 403 could also be configured as any of sunglasses, goggles, masks, shields, or visors.

Since the smart glasses 403 are configured as an electronic device, one or both of the frame and the stems can comprise one or more electrical components. These electrical components can include any of the various components described above with reference to the block diagram schematic (104) of FIG. 1 so as to function as a companion electronic device to the electronic device 401.

The smart glasses 403 can include an augmented reality image presentation device operable to deliver augmented reality imagery to the user 400. The augmented reality image presentation device can be operable with a projector. In one or more embodiments, the frame supports the projector, which is configured to deliver images to a holographic optical element to produce images for the user 400.

The wearable electronic device 402 and the smart glasses 403 of FIG. 4 are examples that serve to show how the configurations of companion electronic devices in accordance with embodiments of the disclosure can vary. Other examples of companion electronic devices will be obvious to those of ordinary skill in the art having the benefit of this disclosure.

As noted above, in one or more embodiments one or more processors of an electronic device transfer videoconference or video recording session user interface controls to a companion electronic device when the electronic device is engaged in a videoconference or video recording session and is capturing one or more images of a participant of the videoconference or video recording session. To provide context for the methods and devices described below with reference to FIGS. 9-13, and turning now to FIGS. 5 and 6, illustrated therein are examples of a videoconference and a video recording session, respectively.

Figure 5:
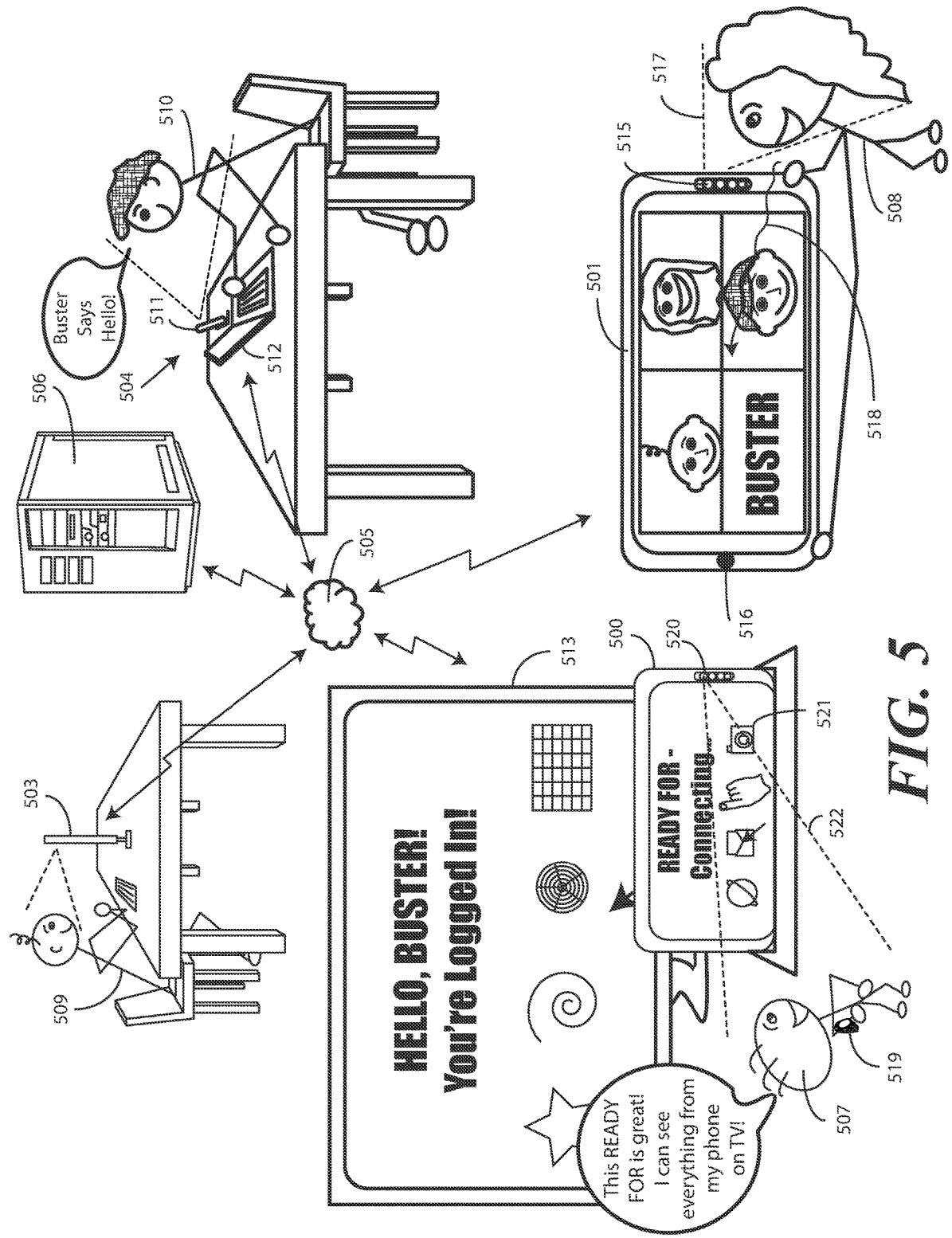
FIG. 5 illustrates one explanatory videoconference system in accordance with one or more embodiments of the disclosure.
Figure 6:
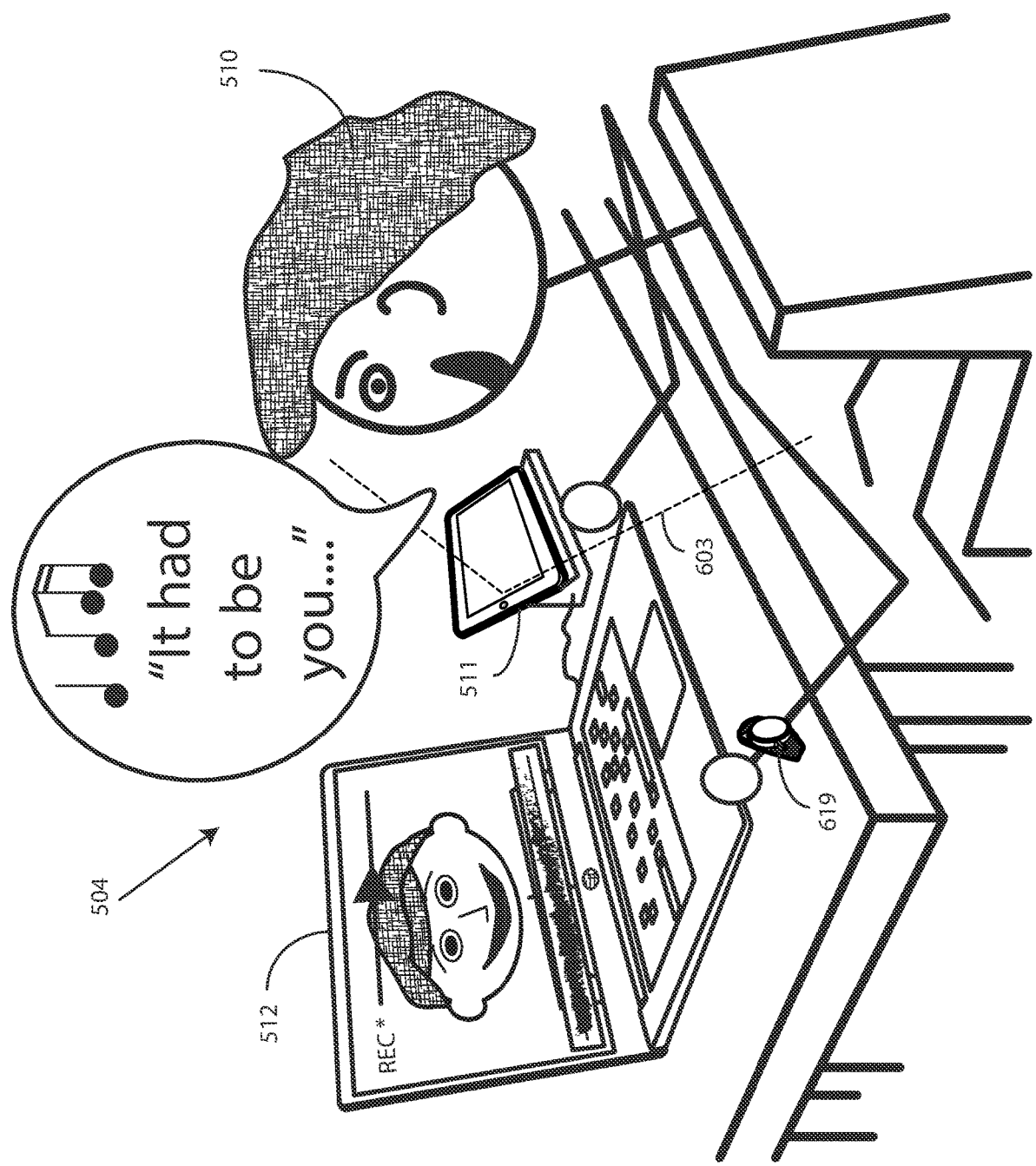
FIG. 6 illustrates one explanator video recording system in accordance with one or more embodiments of the disclosure.

Beginning with FIG. 5, illustrated therein is one explanatory videoconference system in accordance with one or more embodiments of the disclosure. As shown, multiple participants 507,508,509,510 each employ their own respective electronic device, e.g., electronic devices 501,503, to engage with the other participants via the videoconference.

In this illustrative embodiment, electronic device 501 is shown as a smartphone, while electronic device 503 is shown as a desktop computer. While this system provides one explanatory configuration of electronic devices engaged in a videoconference, electronic devices suitable for use in the videoconference system can take other forms as well. For instance, tablet computers, notebook computers, audio-visual devices, mobile phones, smart watches, or other devices can be used by participants to engage in the videoconference as well. Other examples of electronic devices will be obvious to those of ordinary skill in the art having the benefit of this disclosure.

Participants 508,509 are each using a single device to engage in the videoconference. Illustrating by example, participant 508 is using electronic device 501 to engage in the videoconference. Accordingly, the imager 515 capturing one or more images 517 of participant 508 and the audio input 516 receiving acoustic signals 518 from the mouth of participant 508 are integral components of electronic device 501.

By contrast, participants 507, 510 are each using hybrid systems where the device capturing images for the videoconference and the device presenting images of the videoconference are in different devices. By way of example, participant 507 is using a content presentation companion device 513 as an auxiliary, and primary, display for his electronic device 500. This means that the imager 520 capturing one or more images of participant 507, which is situated in the smartphone, is physically separate from the companion electronic device 513 that is presenting the content of the videoconference.

Participant 510 is also using a hybrid system 504 where his tablet computer 511 is serving as a "webcam" for his laptop computer 512, which is serving as a primary display device for the videoconference. Said differently, the tablet computer 511 is acting as the image capture device for the hybrid system 504, while the laptop computer 512 operates as a content presentation companion device serving as a primary display for the tablet computer 511. By doing this, participant 510 leverages the incredibly high quality of the image capture device built into his tablet computer 511 while viewing images captured by this image capture device, as well as image content received from the other electronic devices 500,501,503 across a network 505, on the larger display of the laptop computer 512.

As shown in FIG. 5 each electronic device is engaged in wired or wireless communication with each other across a network 505, one example of which is the Internet via the World Wide Web. It should be noted that the network 505 could be a public, private, local area, wide area, or other type of network across which wired or wireless electronic communications can be exchanged.

In this illustrative embodiment, each electronic device is also in communication with a video conferencing system server complex 506 across the network 505. In one or more embodiments video conferencing system server complex 506 includes components such as a web server, a database server, an audio server, and optionally a video server (the video server may be omitted for audio only conferencing systems) that are operable to facilitate videoconferences between the various electronic devices of the videoconference system.

These components of the video conferencing system server complex 506 can be combined on the same server. Alternatively, these components can be distributed on any number of servers to increase load handling capacity beyond that of a single server, and so forth. Other configurations for the video conferencing system server complex 506 will be obvious to those of ordinary skill in the art having the benefit of this disclosure.

In one or more embodiments, the video conferencing system server complex 506 performs functions such as maintaining a schedule of videoconferences, maintaining lists of participants, as well as allowing each participant's electronic device to engage with the videoconference, and so forth. In one or more embodiments, the video conferencing system server complex 506 also facilitates the transmission of audio and video content during the occurrence of the videoconference.

In one or more embodiments, the video conferencing system server complex 506 functions as an intermediary device to facilitate sharing of audio and/or video content and/or data between the various electronic devices. For example, as can be seen on the displays of electronic device 501, in this example participant 508 can see each other participant engaged in the videoconference.

In the illustrative example of FIG. 5, as can be seen on the display of electronic device 501, participants 508,509,510 are engaged in the videoconference. Participant 507 is in the process of pairing the content presentation companion device 513 with his electronic device 500. Once paired, participant 507 will also join the videoconference. In FIG. 5, the electronic device 500 and the content presentation companion device 513 operate in tandem as a system, with the electronic device 500 providing the processing power while the content presentation companion device 513 serves as the primary display for the electronic device 500. Note that participant 507 is also wearing a companion electronic device 519, which is shown here as a smartwatch.

As shown in FIG. 5, electronic device 500 is electronically in communication with both the content presentation companion device 513 and the companion electronic device 519. When the electronic device 500 is electronically in communication with the content presentation companion device 513, this allows the electronic device 500 to use the larger display of the companion electronic device 513 to present content. Illustrating by example, in one or more embodiments the electronic device 500 can operate in a "content redirection" mode by presenting content such as movies, videos, videoconferences. images, and even a traditional computer user interface, on the display of the companion electronic device 513. The hybrid system being used by participant 510 functions in a similar manner. When the electronic device 500 is concurrently electronically in communication with the companion electronic device 519, this allows one or more videoconference user interface controls to be redirected from the electronic device 500 to the companion electronic device 519, as will be described with reference to FIG. 9 below.

Embodiments of the disclosure contemplate that with the advanced computing power available in smartphones and other electronic devices, users often consume movies, videos, television shows, and other content, including videoconference content, using these devices. By establishing an electronic communication channel between the electronic device 500 and the companion electronic device 513, the processing power of the electronic device 500 can be leveraged to present content on the display of the companion electronic device 513. This allows videoconference participant 507 to use the display of the companion electronic device 513 to engage in the videoconference of FIG. 5. Participant 510 similarly uses the display of the laptop computer 512 for the presentation of images captured by the tablet computer 511.

At the same time, if participant 507—after connecting to the videoconference—were to reach for the user interface controls 521 on the user interface of the electronic device 500, this would disrupt the one or more images 522 being captured by the imager 520 of the electronic device 500 because the participant's hand would likely obstruct his face 802 as he reached toward the imager 520. Advantageously, when a communication device of the electronic device 500 is communicating with both the content presentation companion device 513 and the companion electronic device 519, and the imager 520 is capturing one or more images 522 of the participant 507 of the videoconference, one or more processors of the electronic device 500 dynamically redirect one or more videoconference controls operable at a user interface of the electronic device 500 to a user interface of the companion electronic device 519 so that this obstruction does not occur.

Since the participants 508,509,510 are all engaged in a videoconference, each can see conference content in the form of a combined video feed from each other participant 508,509,510 presented on the display of each electronic device, as well as a video feed of themselves. Under ordinary conditions, each participant 508,509,510 can hear an audio feed from each other participant 508,509,510 as well.

In this illustrative embodiment, participant 510 is acting as a presenter, and is speaking, noting that a friend, Buster, "says hello." This means that participant 510 is delivering acoustic signals having audible frequencies to the audio input of the laptop computer 512 while the imager of the tablet computer 511 captures images of participant 510 while speaking. The one or more images of participant 510 can be captured in the form of video, still images, or combinations of the two. Either the tablet computer 511 or the laptop computer 512 can optionally transmit this video and audio of the presenter to the other electronic devices 500,501,503 via the video conferencing system server complex 506. While participant 510 is the presenter at the moment, it is to be understood that the presenter role can be changed throughout the videoconference as well, with each other participant 507,508,509 taking the role of presenter at other times as situations warrant.

In contrast to a videoconference system, FIG. 6 illustrates a video recording system. Turning now to FIG. 6, participant 510 from FIG. 5 is attempting to become the next singing social media sensation by recording a video of himself singing show tunes using the tablet computer 511 and laptop computer 512 of hybrid system 504 in a video recording context.

As shown, the tablet computer 511 is in a docked configuration in that it has been coupled to a docking station that is electrically coupled to the laptop computer 512. In this illustrative embodiment, the docking station includes one or more electrical contacts that couple to complementary electrical contacts in the tablet computer 511 so that signals from the tablet computer 511, including signals transmitting one or more images 603 captured by an image capture device of the tablet computer 511, can be transmitted to the laptop computer 512 through an electrical connection coupling the docking station to the laptop computer 512. One example of such an electrical connection is that of a wire.

In other embodiments, rather than including electrical contacts, the docking station will include a wireless communication circuit configured to communicate wirelessly with the tablet computer 511. Similarly, the wireless communication circuit of the docking station can be configured to communicate with the laptop computer 512 wirelessly as well. In still other embodiments, the docking station will be a mechanical docking station only, supporting the tablet computer 511 in an orientation in three-dimensional space where the image capture device has its field of view directed toward the participant 510 using the hybrid system 504, with a communication device of the tablet computer 511 communicating wirelessly with the laptop computer 512 directly. Other examples of docking stations and docking station configurations will be obvious to those of ordinary skill in the art having the benefit of this disclosure.

In the illustrative example of FIG. 6, the image capture device of the tablet computer 511 sits in the docking station with its field of view directed toward participant 510. The image capture device is capturing one or more images 603 of participant 510 in the form of video while the participant 510 is signing, which are being delivered to the laptop computer 512 for presentation on the display of the laptop computer 512 and for storage in memory.

If participant 510, during this video recording session, were to reach for the user interface controls on the user interface of the tablet computer 511, this would disrupt the one or more images 603 being captured by the imager of the tablet computer 511. Advantageously, when a communication device of the tablet computer 511 is communicating with both the laptop computer 512, operating as a primary display or the tablet computer 511, and with a companion electronic device 619, and the imager of the tablet computer 511 is capturing one or more images 603 of the participant 510 of the video recording session, one or more processors of the tablet computer 511 dynamically redirect one or more videoconference controls operable at a user interface of the tablet computer 511 to a user interface of the companion electronic device 619 so that this obstruction does not occur.

Figure 7:
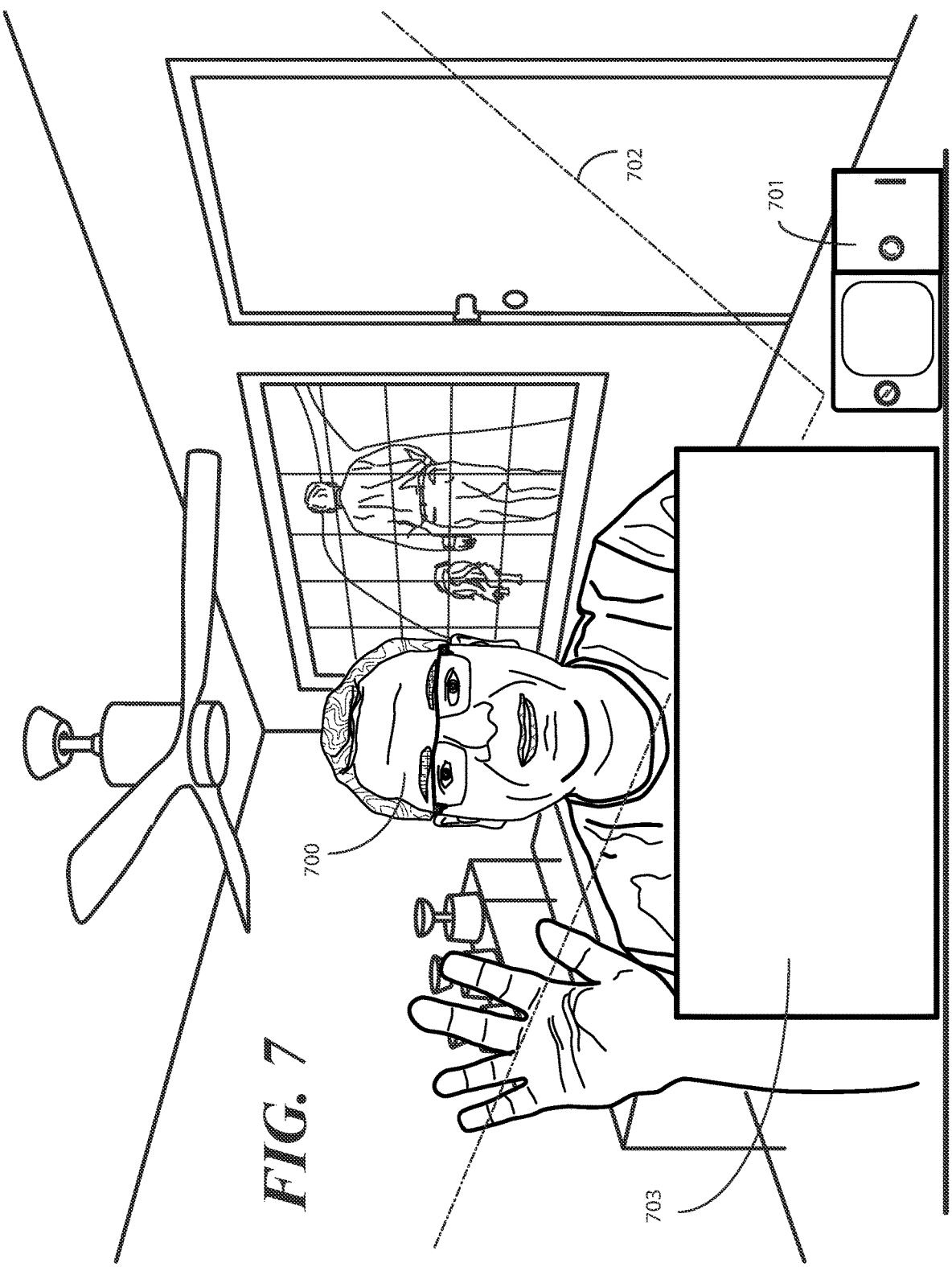
FIG. 7 illustrates a participant using an electronic device with a content presentation companion device in an application where one or more images of the participant are being captured by the electronic device in accordance with one or more embodiments of the disclosure.
Figure 8:
FIG. 8 illustrates a situation that can arise in the application of FIG. 7.

Now that the videoconference and video recording applications are understood, FIGS. 7-8 illustrate how attempting to access user interface controls during a videoconference or video recording can be problematic and can disrupt the one or more images being captured by an electronic device. Beginning with FIG. 7, illustrated therein is a person 700 engaged in an application. The application could be either videoconference or a video recording session. For illustrative purposes, it will be described as a videoconference, but the operation during a video recording is similar.

As shown in FIG. 7, the person 700 is using a smartphone 701 having a first device housing that is pivotable about a hinge relative to a second device housing between an axially displaced open position and a closed position to capture one or more images 702 of himself during the videoconference.

In FIG. 7, the smartphone 701 is in a partially open position with its imager capturing one or more images 702 of the person 700 while the person engages in a videoconference. The smartphone 701 is being used as a "webcam" in the videoconference, while a larger monitor is being used as a content presentation companion device 703. Since the smartphone 701 has a more advanced image capture device than the content presentation companion device 703, the person 700 prefers to use it to capture images to be used in the videoconference. However, since the display of the content presentation companion device 703 is much larger than the display of the smartphone 701, the person 700 prefers to use the content presentation companion device 703 as a primary display in the videoconference so that he can more clearly see his friends, each of whom are engaged in the videoconference.

Since the smartphone 701 includes a first device housing that is pivotable about a hinge relative to a second device housing, the person 700 has pivoted the smartphone 701 to a partially open position. Additionally, the person 700 has placed the smartphone 701 sideways on the desk so that the smartphone 701 resembles a two-picture frame where the two picture frame portions are joined by the hinge. This orients the imager of the smartphone 701 in the landscape orientation in three-dimensional space.

Turning now to FIG. 8, illustrated therein is the problem that can occur, as seen from another electronic device 800 engaged in the videoconference. When person 700 reaches for the user interface controls presented at the user interface of the smartphone (701), his hand 801 blocks his face 802 due to the fact that his hand has to reach toward the image capture device of the smartphone (701) when reaching for the user interface. As shown, his hand fills half the frame and almost completely obscures his face. This can be very disruptive and distracting during a videoconference. If the person 700 had been engaged in a video recording session like that shown in FIG. 6, perhaps to get an audition for a part in a Broadway revival of the Ginger Rogers and Cornel Wiled film version of It Had to Be You, this type of obstruction could annoy the producer and cost the person 700 both the audition and his one and only shot at stardom.

Advantageously, embodiments of the disclosure prevent this from happening by providing methods for an electronic device, executable by one or more processors of the electronic device, that detect the electronic device engaging in a videoconference or video recording while electronically in communication with both a companion electronic device operating as a primary display for the electronic device and a companion electronic device, which may be a wearable electronic device configured as a smartwatch. When this occurs, the one or more processors redirect one or more videoconference or video recording session to a user interface of the companion electronic device when user interface with the one or more videoconference or video recording session at the user interface of the electronic device will at least partially obscure depictions of a participant of the videoconference or video recording session captured by the image capture device of the electronic device. One method of how this can occur is shown in FIG. 9.

Figure 9:
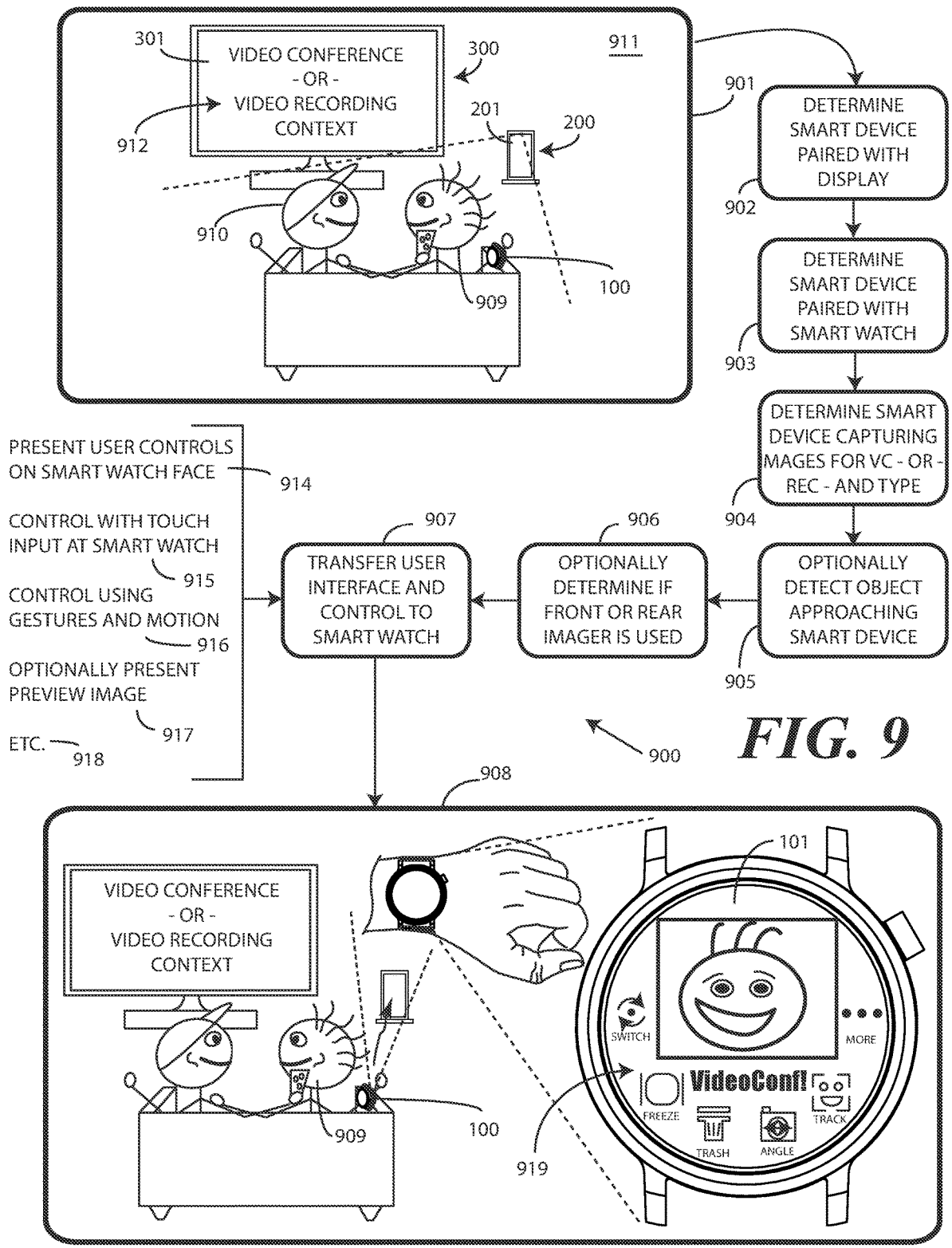
FIG. 9 illustrates one explanatory method in accordance with one or more embodiments of the disclosure.

Turning now to FIG. 9, illustrated therein is one explanatory method 900 illustrating how the smartwatch 100 of FIG. 1, the electronic device 200 of FIG. 2, and the content presentation companion device 300 can be used as a system to redirect user interface controls from the electronic device 200 to the smartwatch 100. Beginning at step 901, the electronic device 200 is engaged in an application. The application could be either one of a videoconference or video recording session context 912, examples of which were illustrated and described above with reference to FIGS. 5 and 6.

At step 901 the one or more processors (207) of the electronic device 200 are causing the image capture device (216) of the electronic device 200 to capture one or more images of at least one participant of the videoconference or video recording session context 912. Additionally, the one or more processors (207) of the electronic device 200 cause the communication device (209) of the electronic device to establish electronic communication with both the content presentation companion device 300 and the wearable electronic device that is the smartwatch 100. Images captured by the image capture device (216) during the videoconference or video recording session context 912 are then delivered to the content presentation companion device 300 for presentation to the environment 911.

A first person 909 and a second person 910 are situated within an environment 911 of the electronic device 200 during the videoconference or video recording session context 912. In this illustration, each is a participant in the videoconference or video recording session context 912. However, the first person 909 is the owner of the electronic device 200 in this example. Accordingly, he delivers user input to the electronic device 200 to cause content associated with the videoconference or video recording session context 912 to be delivered from the electronic device 200 to the content presentation companion device 300 since its display 301 is much larger than the display 201 of the electronic device 200. When in this content delivery mode of operation, the content presentation companion device 300 serves as the primary display for the electronic device 200. This enables both the first person 909 and the second person 910 to easily see images associated with either the videoconference or the video recording session. In this illustration, the first person 909 is also wearing a wearable companion device configured as a smartwatch 100.

At step 902, one or more processors (207) of the electronic device 200 detect, using the communication device (209) of the electronic device 200, that the electronic device 200 is electronically in communication with both the content presentation companion device 300 while the content presentation companion device 300 is operating as the primary display for the electronic device 200. At step 903, the one or more processors (207) of the electronic device 200 detect, again using the communication device (209) of the electronic device 200, that the electronic device is electronically in communication with the wearable companion device defined by the smartwatch 100.

At step 904, the one or more processors (207) of the electronic device 200, operating in tandem with one or more sensors (218) of the electronic device 200, detect that the communication device (209) is electronically in communication with both the content presentation companion device 300 and the smartwatch 100 while the videoconference or video recording session context 912 is occurring. Thus, in one or more embodiments step 904 comprises detecting the communication device (209) electronically in communication with both the content presentation companion device 300 operating as the primary display of the electronic device 200 and the wearable companion device defined by the smartwatch 100 while the content presentation companion device 300 is operating as the primary display for the electronic device 200 during the videoconference or video recording session context 912 and the image capture device (216) of the electronic device 200 is capturing one or more images of person 909 and person 910, who are participants in the videoconference or video recording session. Step 904 can further comprise determining whether the videoconference or video recording session context 912 is that of a videoconference or a video recording session.

At optional step 905, one or more sensors (218) of the electronic device 200 can optionally determine whether an object is approaching. This information can be useful in determining whether one of the problematic situations described above with reference to FIG. 8 is about to occur.

At optional step 906, the one or more processors (207) of the electronic device 200 can optionally determine whether a front facing imager, i.e., one that is facing a user when the user is looking at the display 201 of the electronic device 200 (out of the page in step 901), or a rear facing imager, i.e., one that is facing away from a user when the user is looking at the display 201 of the electronic device 200 (into the page in step 901) to capture the one or more images of a subject. As will be described in more detail with reference to FIG. 12 below, embodiments of the disclosure contemplate than in a video recording session a person capturing the one or more images with the electronic device 200 may use the rear facing image capture device to capture images of a subject while looking at the display 201 of the electronic device 200. Since movement toward the display 201 to access one or more video recording user interface controls will not interrupt or disrupt the one or more images being captured by the rear facing imager, this information may be used to preclude a transfer of the video recording user interface controls to the smartwatch 100. However, in a videoconference application, it will frequently be the case that the image capture device capturing images of a participant and the display 201 or other primary user interface will be located on the same side and transfer of one or more videoconference user interface controls to the smartwatch 100 may be merited. This information can be obtained at optional step 906.

At step 907, the one or more processors (207) of the electronic device, in response to detecting the communication device 209 being in communication with both the content presentation companion device 300 and the wearable companion device defined by the smartwatch 100 while the content presentation companion device 300 is operating as a primary display for the electronic device 200 during a videoconference or video recording session context 912 and the image capture device (216) of the electronic device 200 is capturing one or more images of a participant of the videoconference or video recording session context 912, redirect one or more user interface controls 919 operable at a user interface of the electronic device (200), e.g., display 201, to a user interface of the wearable companion device defined by the smartwatch 100, which in this case is the display 101 of the smartwatch 100 as shown at step 908. This transfer can occur in a variety of ways.

In one or more embodiments, the transfer of the user interface controls 919 to the smartwatch 100 causes the user interface controls 919 to be presented 914 as a plurality of user actuation targets on the display 101 of the smartwatch 100 as shown at step 901. Person 909 can then interact with these user actuation targets to control the videoconference or video recording session context 912 without the need to access the user interface defined by the display 201 of the electronic device 200. Thus, the user interactions 915 will not disrupt or obscure the depictions of person 909 or person 910 in the one or more images being captured by the image capture device (216) of the electronic device 200.

In one or more embodiments, when the user interface controls 919 are transferred to the smartwatch 100, they are contextually presented on the display 101 of the smartwatch 100 for only a predefined duration when a particular use case is occurring so as not to overly tax the energy storage device of the smartwatch 100. This means that the user interface controls 919 are presented for user interaction only while the one or more processors (207) of the electronic device 200 detect the communication device (209) being in communication with both the content presentation companion device 300 and the wearable companion device defined by the smartwatch 100 while the content presentation companion device 300 is operating as a primary display for the electronic device 200 during a videoconference or video recording session context 912 and the image capture device (216) of the electronic device 200 is capturing one or more images of a participant of the videoconference or video recording session context 912 to conserve power. If, for example, the one or more processors (207) were monitoring for user input interacting with the user interface controls 919 continually—be it gesture input, touch input, or other input—the energy storage device of the smartwatch 100 would be depleted rather quickly. Accordingly, the contextual redirection of the user interface controls 919 under certain conditions helps to conserve energy in the energy storage device of the smartwatch 100 by surfacing the user interface controls 919 for user interaction pragmatically.

When person 909 interacts 915 with these user actuation targets by touching the display 101 of the smartwatch 100 at the locations where the user actuation targets are located, videoconference or video recording session control signals are then transmitted to the electronic device 200 to control the videoconference or video recording session context 912. Alternatively, as will be described below with reference to FIG. 11, in other embodiments gestures 916 translating the smartwatch 100 in three-dimensional space can be used to cause control signals to be transmitted from the smartwatch 100 to the electronic device 200 to control the videoconference or video recording session context 912.

In one or more embodiments, a preview image 917 of a participant of a videoconference or video recording session can also be presented on the user interface of the wearable companion device defined by the smartwatch. In one or more embodiments, this preview image 917 is a captured image taken while the participant is looking at the image capture device (216) of the electronic device 200 and before the participant engages with the smartwatch 100 to control the videoconference or video recording session context 912. Embodiments of the disclosure contemplate that a participant in the videoconference or video recording session context 912, e.g., person 909, may want to see how they look in the one or more images being captured by the image capture device (216) of the electronic device 200.

Embodiments of the disclosure also contemplate that the person 909 may need to turn their head sideways or downward to look at the smartwatch 100. Accordingly, in one or more embodiments the one or more processors (207) of the electronic device 200 retrieve a previously captured image from the memory (208) of the electronic device 200 to use as the preview image 917 so that the person 909 can see how they normally look in the videoconference or video recording session context 912 rather than the side of their head as they interact with the videoconference or video recording session user interface controls that were transferred to the wearable companion device defined by the smartwatch at step 907. While FIG. 9 explains some ways the transfer occurring at step 907 can occur, others 918 will be obvious to those of ordinary skill in the art having the benefit of this disclosure.

The one or more user interface controls 919 shown at step 908 are videoconference user interface controls. In addition to these videoconference user interface controls being presented on the display 101 of the smartwatch as interactive user actuation targets, the preview image 917 of person 909 is also presented on the display 101.

In this example, the user interface controls 919 have been rearranged from their format on the display 201 of electronic device 200, which is rectangular, to fit the display more appropriately 101 of the smartwatch 100, which is round. In this illustrative example, the user interface controls 919 allow the person 909 to manipulate the one or more images being captured during a videoconference by actuating various user icons configured as user actuation targets. In this example, the user interface controls 919 allow the person 909 to switch between image capture devices, freeze video being captured by the image capture device (216), switch to a wide-angle lens, perform facial tracking, discard images or video, and perform other operations.

Figure 10:
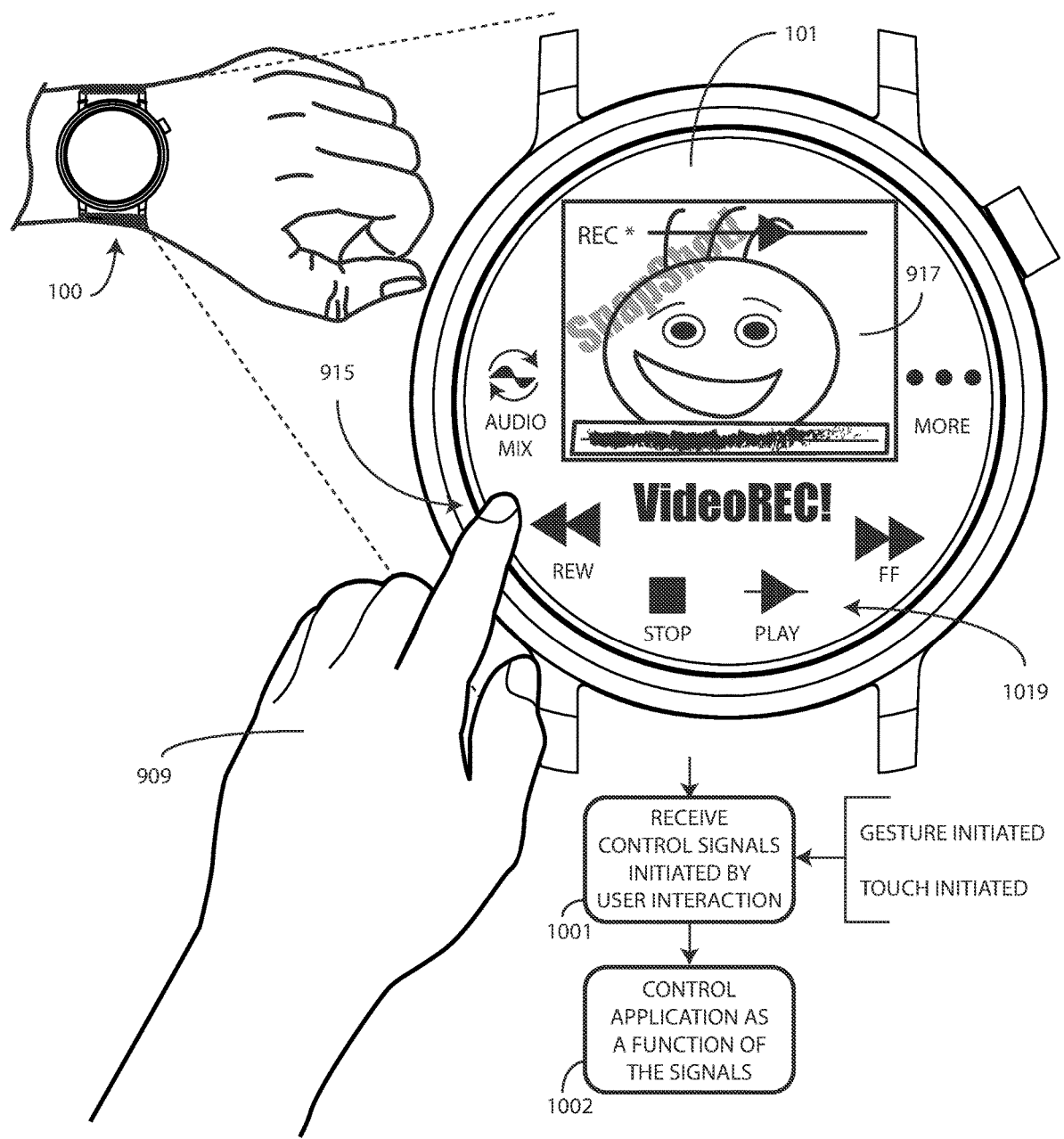
FIG. 10 illustrates one explanatory user interface after user interface controls have been redirected to a companion electronic device in accordance with one or more embodiments of the disclosure.

By contrast, and turning now to FIG. 10, illustrated therein are one or more user interface controls 1019 that may be presented after the transfer of step (907) of FIG. 9 when the videoconference or video recording session context (912) is a video recording session. Once again, the user interface controls 1019 have been rearranged from their format on the display (201) of electronic device (200) to more appropriately fit the display 101 of the smartwatch 100. Since the user interface controls 1019 are video recording session user interface controls, in this illustrative example the user interface controls 1019 allow the person 909 to manipulate the one or more images being captured during a video recording session by actuating various user icons configured as user actuation targets. In this example, the user interface controls 1019 allow the person 909 to fast forward the video recording, stop the video recording, start the video recording, rewind the video recording, and adjust the audio mix, in addition to offering an additional options user actuation target.

Since the person 909 may want to see how they look in the video recording session, in this illustrative embodiment a preview image 917 of the person 909 is presented on the user interface of the wearable companion device defined by the smartwatch 100. In this illustrative example, as indicated by the "snapshot" watermark, the preview image 917 is a captured image taken while the person 909 was looking at the image capture device (216) of the electronic device (200) and before the person 909 engages with the smartwatch 100 to control the video recording session. Since the person 909 is recording himself, he may want to see how he looks in the one or more images being captured by the image capture device (216) of the electronic device (200).

Since he may need to look down and sideways to look at the smartwatch 100, in one or more embodiments the preview image 917 is a previously captured image retrieved from the memory (208) of the electronic device (200) that was taken while the person 909 was looking at the image capture device (216). This allows the person to see how they look in the video recording session instead of seeing the side of their head as they interact with the user interface controls 1019. If he is not pleased with his appearance, the person 909 can use the user interface controls 1019 at the display 101 of the smartwatch 100 to make adjustments in one or more embodiments.

Once the person 909 interacts 915 with the user interface controls 1019 that have been redirected to the smartwatch 100, in one or more embodiments the communication device (107) of the smartwatch 100 sends video recording (or in the case of FIG. 9, videoconference) control signals to the electronic device (200) to control the videoconference or video recording session context (912). Accordingly, in one or more embodiments step 1001 comprises the electronic device (200) receiving, after the redirecting, one or more embodiments videoconference or video recording session control signals from the wearable companion device defined by the smartwatch 100. Step 1002 then comprise controlling one or more control parameters (identified by the user interface controls (919) of FIG. 9 or the user interface controls 1019 of FIG. 10) as a function of the one or more videoconference or video recording session control signals. In the illustrative embodiment of FIG. 10, the one or more videoconference or video recording session control signals are initiated by the actuation of at least one user interface controls at the user interface of the smartwatch 100 defined by the display 101 when the person 909 touches a particular user actuation target with their finger.

Figure 11:
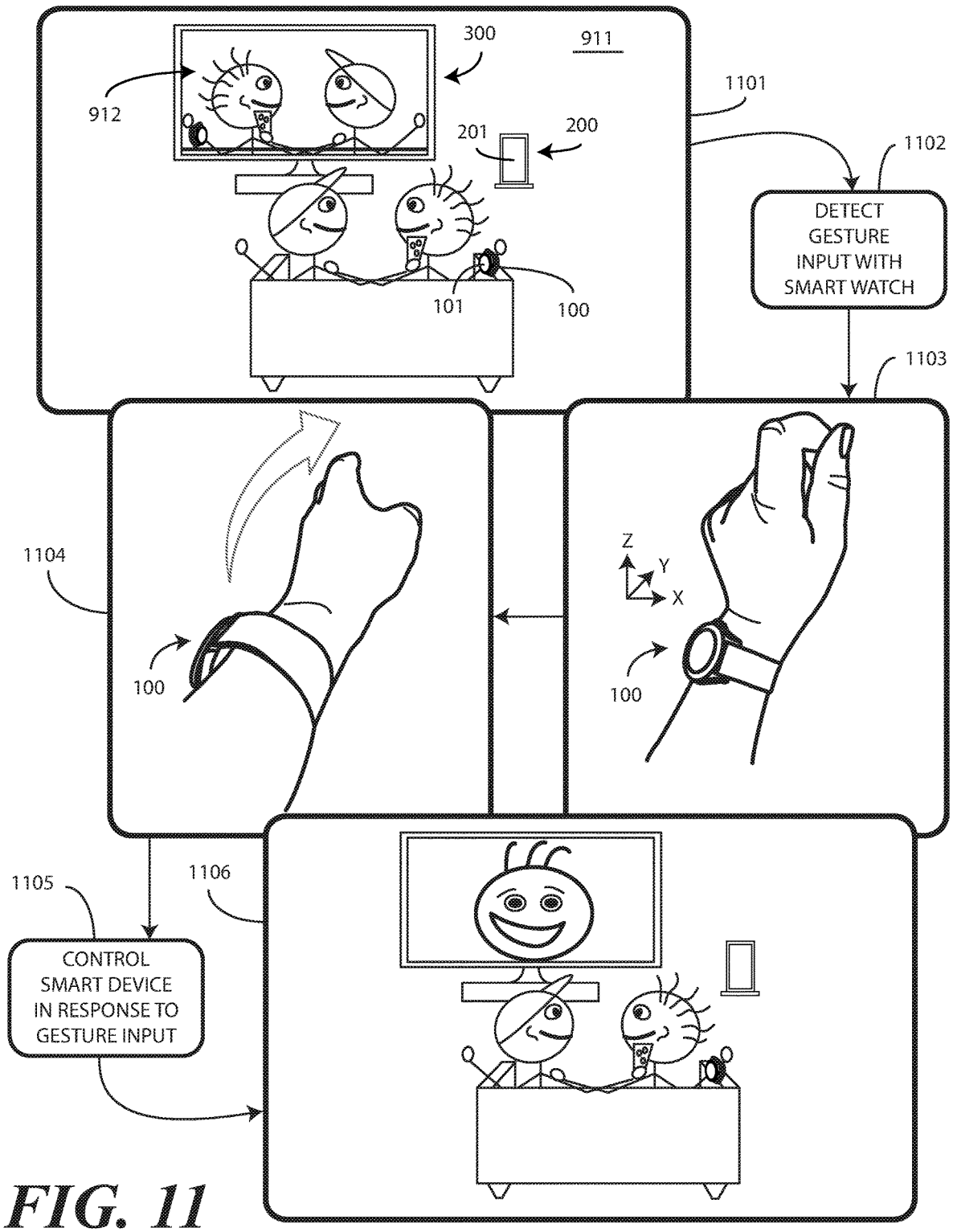
FIG. 11 illustrates one explanatory method in accordance with one or more embodiments of the disclosure.

By contrast, turning now to FIG. 11, in other embodiments the person 909 can control the videoconference or video recording session context 912 using a gesture. At step 1101, the one or more processors (207) of the electronic device 200 are causing the image capture device (216) of the electronic device 200 to capture one or more images of at least one participant of the videoconference or video recording session context 912. Additionally, the one or more processors (207) of the electronic device 200 cause the communication device (209) of the electronic device to establish electronic communication with both the content presentation companion device 300 and the wearable electronic device that is the smartwatch 100. Images captured by the image capture device (216) during the videoconference or video recording session context 912 are then delivered to the content presentation companion device 300 for presentation to the environment 911.

Accordingly, the one or more processors (207) of the electronic device 200, in response to detecting the communication device (209) being in communication with both the content presentation companion device 300 and the wearable companion device defined by the smartwatch 100 while the content presentation companion device 300 is operating as a primary display for the electronic device 200 during a videoconference or video recording session context 912 and the image capture device (216) of the electronic device 200 is capturing one or more images of a participant of the videoconference or video recording session context 912, redirect one or more user interface controls (919) operable at a user interface of the electronic device (200), e.g., display 201, to a user interface of the wearable companion device defined by the smartwatch 100, one example of which in this case is the display 101 of the smartwatch 100.

At step 1102, one or more sensors (115) of the smartwatch 100 detect a gesture translating the smartwatch 100 in three-dimensional space. As shown at steps 1103,1104, in this illustration the gesture comprises moving the forearm from a vertical position to a horizontal position in three-dimensional space. At step 1105, the electronic device 200 receives one or more videoconference or video recording session control signals from the smartwatch 100 and controls the videoconference or video recording session as a function of those videoconference or video recording session control signals. In this illustration, as shown at step 1106, this control has resulted in a zoom operation being performed.

Figure 12:
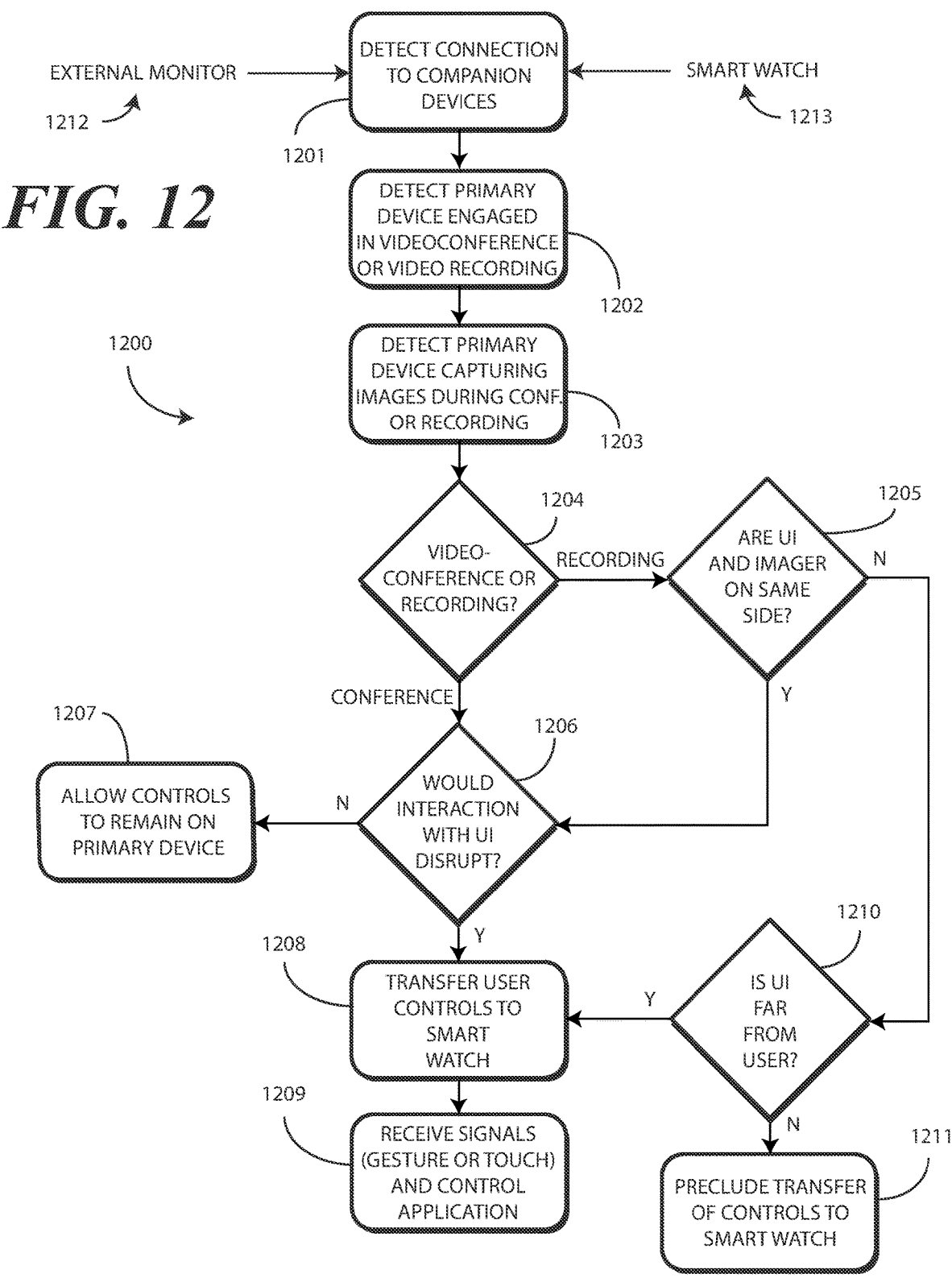
FIG. 12 illustrates another explanatory method in accordance with one or more embodiments of the disclosure.

Turning now to FIG. 12, illustrated therein is one explanatory method 1200 in accordance with one or more embodiments of the disclosure. Beginning at step 1201, one or more processors of an electronic device detect the electronic device engaging in a videoconference or video recording session while electronically in communication with both a companion electronic device 1212 operating as a primary display for the electronic device and a smartwatch 1213. At step 1202, the one or more processors detect the electronic device is engaged in a videoconference or video recording session. At step 1203, the one or more processors detect an image capture device of the electronic device capturing one or more images depicting a participant in the videoconference or video recording session. Decision 1204 determines whether the videoconference or video recording session is a videoconference or a video recording.

If the videoconference or video recording session is a video recording, decision 1205 determines whether the image capture device and the user interface of the electronic device are situated on the same side of the electronic device. If they are, decision 1206 determines whether user interaction with the one or more user interface controls at the user interface of the electronic device will at least partially obscure depictions of the participant of the video recording in the one or more images.

Where it will not, step 1207 precludes the video recording user interface controls from being transferred to the smartwatch 1213, thereby keeping the video recording user interface controls on the user interface of the electronic device. By contrast, where user interaction with the user interface controls at the user interface of the electronic device would at least partially obscure depictions of the participant of the video recording, step 1208 redirects one or more video recording controls to a user interface of the smartwatch 1213 when user interaction with the one or more video recording controls at the user interface of the electronic device will at least partially obscure depictions of the participant of the video recording captured by the image capture device of the electronic device. In one or more embodiments, step 1208 occurs only when the user interface of the electronic device and the image capture device are situated on the same side of the electronic device. Moreover, in one or more embodiments step 1208 occurs only when the user interaction with the one or more user interface controls at the user interface of the electronic device will at least partially obscure the participant of the videoconference in the one or more images.

Returning to decision 1205, if the user interface of the electronic device and the image capture device capturing images of the participant of the video recording are on opposite sides of the electronic device, decision 1210 determines a distance between the participant of the videoconference and the electronic device. In one or more embodiments, the redirection of the one or more user interface controls to the user interface of the wearable companion device at step 1208 occurs only when the distance exceeds a predefined threshold. Accordingly, if the distance is less than this threshold, step 1211 precludes the redirection the one or more user interface controls to the user interface of the wearable companion device.

If decision 1204 determines that the videoconference or video recording session is a videoconference, decision 1206 then determines whether user interaction with the one or more videoconference controls at the user interface of the smartphone will at least partially obscure depictions of the participant of the videoconference in the one or more images. If it would, step 1208 dynamically redirects the one or more videoconference controls to the user interface of the smartwatch. In one or more embodiments, this step 1208 occurs only when the user interaction with the one or more videoconference user interface controls at the user interface of the smartphone will at least partially obscure the depictions of the participant of the videoconference in the one or more images. Otherwise, transfer is precluded at step 1207.

At step 1209, a communication device of the electronic device receives one or more videoconference or video recording session control signals from the smartwatch 1213 and causes videoconference or video recording session output presented on the companion electronic device 1212 to change as a function of the one or more videoconference or video recording session control signals. As previously described above with reference to FIGS. 10-11, in one or more embodiments the one or more videoconference or video recording session control signals indicate that a videoconference or video recording session control presented at the user interface of the smartwatch 1213 has been touched. In other embodiments, the one or more videoconference or video recording session signals indicate that the smartwatch 1213 has been translated in three-dimensional space in accordance with a predefined gesture.

Figure 13:
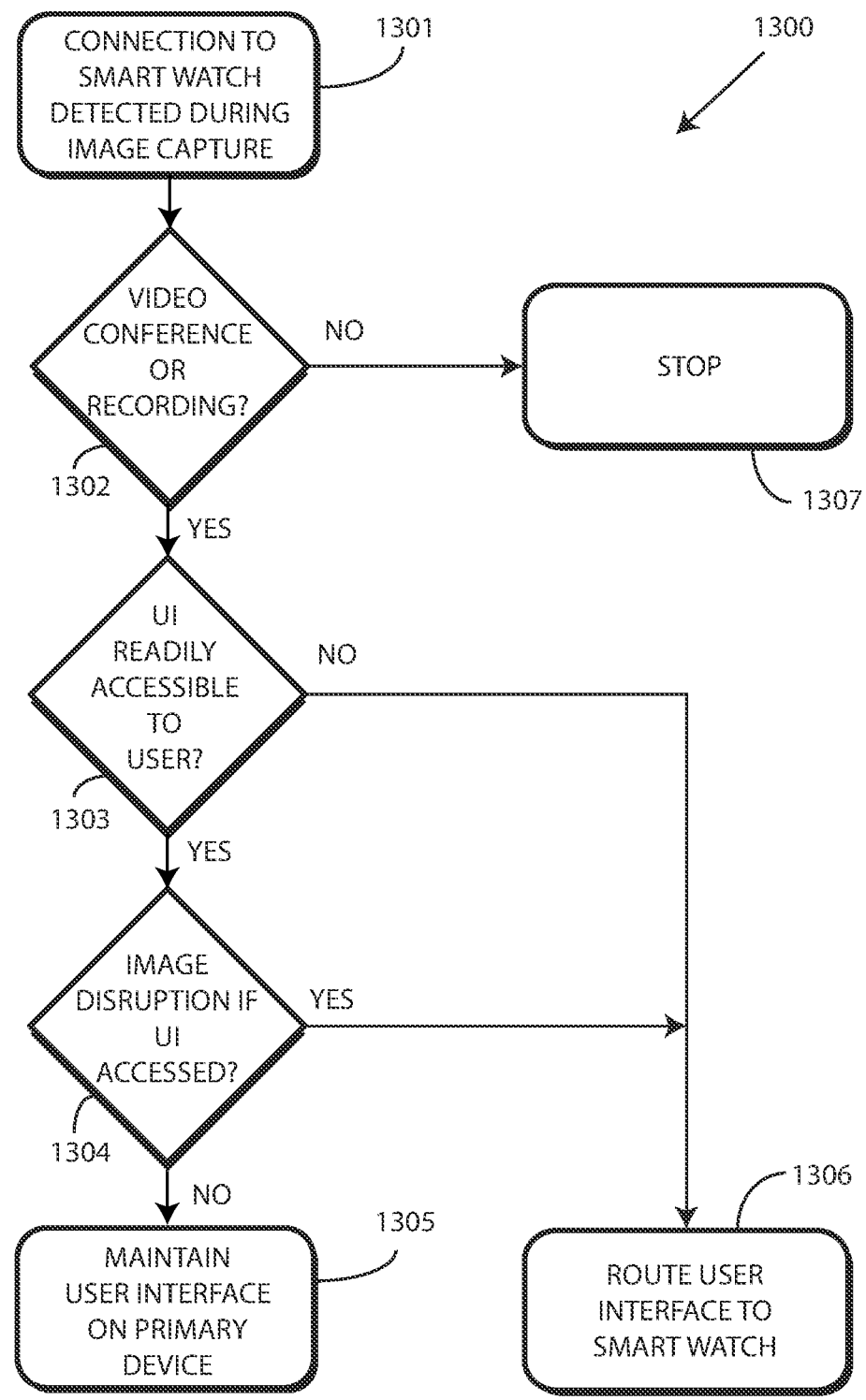
FIG. 13 illustrates another explanatory method in accordance with one or more embodiments of the disclosure.

Turning now to FIG. 13, illustrated therein is another method 1300 in accordance with one or more embodiments of the disclosure. Beginning at step 1301, the method 1300 detects an electronic device electronically in communication with a companion electronic device operating as a primary display for the electronic device and a smartwatch. Decision 1302 determines whether the determination of step 1301 occurs while the electronic device engages in a videoconference or video recording session. If no videoconference or video recording session is occurring, the method 1300 ends at step 1307.

Where the electronic device is engaging in a videoconference or video recording session while electronically in communication with both a companion electronic device operating as a primary display for the electronic device and a wearable electronic device such as the smartwatch, decision 1303 determines a distance between an authorized user of the electronic device and the electronic device itself. If the distance is beyond a predefined threshold such that the user cannot reach the user interface, step 1306 comprises redirecting one or more videoconference or video recording session controls to a user interface of the smartwatch.

If the distance is less than the predefined threshold where the user can access the user interface of the electronic device, decision 1304 determines whether user interaction with the one or more user interface controls at the user interface of the electronic device will at least partially obscure depictions the subject of the videoconference or video recording session in the one or more images. Where it will, step 1306 comprises redirecting one or more videoconference or video recording session controls to a user interface of the smartwatch when user interaction with the one or more videoconference or video recording session controls at a user interface of the electronic device will at least partially obscure depictions of a subject of the videoconference or video recording session in one or more videoconference or video recording session images captured by an image capture device of the electronic device.

Where it will not, step 1305 comprises precluding the redirecting the one or more user interface controls to the user interface of the wearable companion device. In one or more embodiments, this step 1305 occurs only when the distance is within a predefined threshold, as determined by decision 1303.

Figure 14:
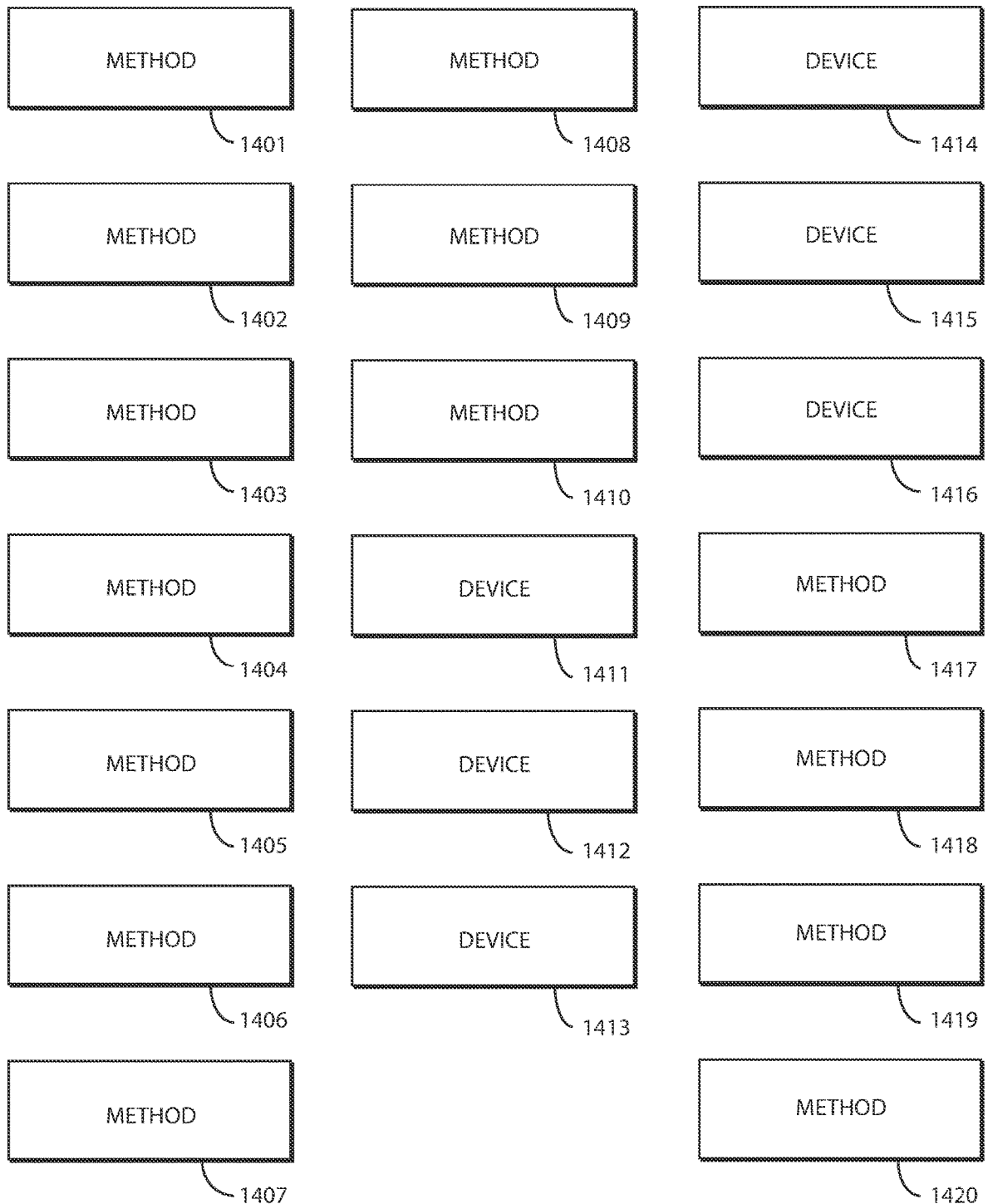
FIG. 14 illustrates various embodiments of the disclosure.
Figure 15:
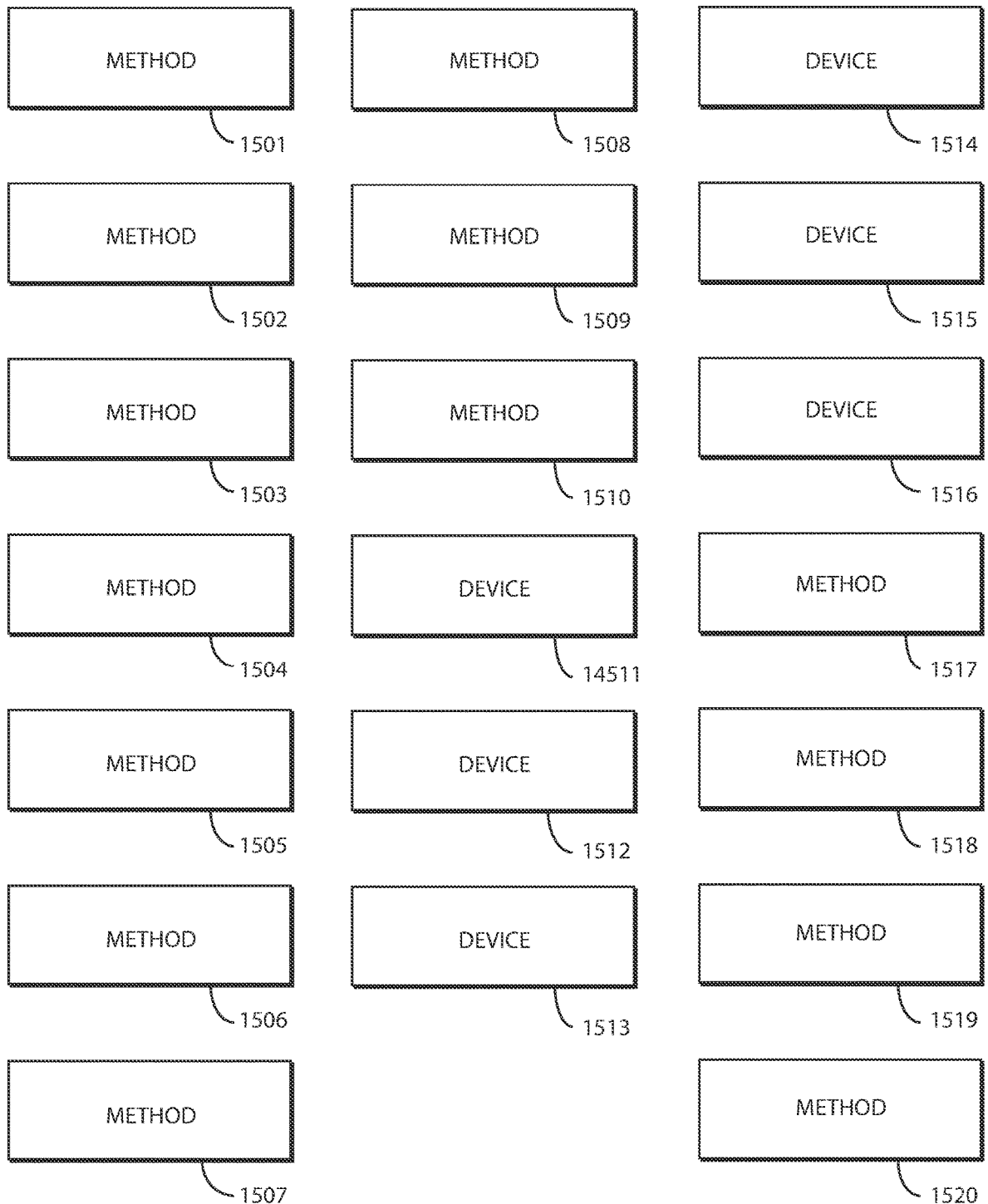
FIG. 15 illustrates various other embodiments of the disclosure.

Turning now to FIGS. 14-15, illustrated therein are various embodiments of the disclosure. The embodiments of FIGS. 14-15 are shown as labeled boxes in FIGS. 14-15 due to the fact that the individual components of these embodiments have been illustrated in detail in FIGS. 1-13, which precede FIGS. 14-15. Accordingly, since these items have previously been illustrated and described, their repeated illustration is no longer essential for a proper understanding of these embodiments. Thus, the embodiments are shown as labeled boxes.

Beginning with FIG. 14, at 1401 a method in an electronic device comprises detecting, with one or more processors, a communication device electronically in communication with both a content presentation companion device operating as a primary display for the electronic device and a wearable companion device. At 1401, this occurs while the content presentation companion device is operating as the primary display for the electronic device during a videoconference and an image capture device of the electronic device is capturing one or more images of a participant of the videoconference. At 1401, and in response to the detecting, the method comprises redirecting, with the one or more processors, one or more user interface controls operable at a user interface of the electronic device to a user interface of the wearable companion device.

At 1402, the method of 1401 further comprises receiving, after the redirecting, one or more videoconference control signals from the wearable companion device. At 1402, the method comprises controlling one or more control parameters of the videoconference as a function of the one or more videoconference control signals.

At 1403, the one or more videoconference control signals of 1402 are initiated by actuation of at least one user interface control of the one or more user interface controls at the user interface of the wearable companion device. At 1404, the wearable companion device of 1402 comprises a smartwatch. At 1405, the one or more videoconference signals of 1404 are initiated by a gesture translating the smartwatch in three-dimensional space.

At 1406, the method of 1401 further comprises determining, by the one or more processors using one or more sensors of the electronic device, whether user interaction with the one or more user interface controls at the user interface of the electronic device will at least partially obscure depictions of the participant of the videoconference in the one or more images. At 1406, the redirecting the one or more user interface controls to the user interface of the wearable companion device occurs only when the user interaction with the one or more user interface controls at the user interface of the electronic device will at least partially obscure the participant of the videoconference in the one or more images.

At 1407, the method of 1401 further comprises determining, by the one or more processors, whether the image capture device and the user interface of the electronic device are situated on the same side of the electronic device. At 1407, the redirecting the one or more user interface controls to the user interface of the wearable companion device occurs only when the user interface of the electronic device and the image capture device are situated on the same side of the electronic device.

At 1408, the method of 1401 further comprises determining, using one or more sensors of the electronic device, a distance between the participant of the videoconference and the electronic device. At 1408, the redirecting the one or more user interface controls to the user interface of the wearable companion device occurs only when the distance exceeds a predefined threshold.

At 1409, the method of 1401 further comprises causing the user interface of the wearable companion device to present at least one image of the participant of the videoconference concurrently with the one or more user interface controls. At 1410, the one or more user interface controls of 1401 comprise one or more of a facial tracking user actuation target, a video freeze user actuation target, an image capture device angle change user actuation target, and/or a switch imager user actuation target.

At 1411, an electronic device comprises a communication device electronically communicating with both a content presentation companion device operating as a primary display for the electronic device and a wearable electronic device during a videoconference. At 1411, the electronic device comprises an image capture device capturing one or more images of a participant of the videoconference. At 1411, the electronic device comprises one or more processors dynamically redirecting one or more videoconference controls operable at a user interface of the electronic device to a user interface of the wearable electronic device while the image capture device is capturing the one or more images of the participant of the videoconference.

At 1412, the electronic device of 1411 comprises a smartphone and the wearable electronic device comprises a smartwatch. At 1413, the one or more videoconference controls of 1412 comprise one or more of a facial tracking user actuation target, a video freeze user actuation target, an image capture device angle change user actuation target, and/or a switch imager user actuation target.

At 1414, the communication device of 1412 receives signals indicating actuation of at least one videoconference control at the user interface of the smartwatch. At 1414, the one or more processors control one or more control parameters of the videoconference in response to receiving the signals indicating the actuation of the at least one videoconference control at the user interface of the smartwatch.

At 1415, the communication device of 1412 receives signals indicating translation of the smartwatch in three-dimensional space in accordance with a predefined gesture. At 1415, the one or more processors control one or more control parameters of the videoconference in response to receiving the signals.

At 1416, the electronic device of 1412 further comprises one or more sensors determining whether user interaction with the one or more videoconference controls at the user interface of the smartphone will at least partially obscure depictions of the participant of the videoconference in the one or more images. At 1416, the one or more processors of the electronic device dynamically redirect the one or more videoconference controls to the user interface of the smartwatch only when the user interaction with the one or more videoconference user interface controls at the user interface of the smartphone will at least partially obscure the depictions of the participant of the videoconference in the one or more images.

At 1417, a method in an electronic device comprises detecting, by one or more processors, the electronic device engaging in a videoconference while electronically in communication with both a companion electronic device operating as a primary display for the electronic device and a smartwatch. At 1417, the method comprises redirecting one or more videoconference controls to a user interface of the smartwatch when user interaction with the one or more videoconference controls at a user interface of the electronic device will at least partially obscure depictions of a participant of the videoconference in one or more videoconference images captured by an image capture device of the electronic device.

At 1418, the method of 1417 further comprises receiving, by a communication device of the electronic device, one or more videoconference control signals from the smartwatch and causing a videoconference output presented on the companion electronic device to change as a function of the one or more videoconference control signals. At 1419, the one or more videoconference control signals of 1418 indicate that a videoconference control presented on the user interface of the smartwatch has been touched. At 1420, the one or more videoconference control signals of 1418 indicate that the smartwatch has been translated in three-dimensional space in accordance with a predefined gesture.

Turning now to FIG. 15, at 1501 a method in an electronic device comprises detecting, with one or more processors, a communication device electronically in communication with both a content presentation companion device operating as a primary display for the electronic device and a wearable companion device while the content presentation companion device is operating as the primary display for the electronic device and an image capture device of the electronic device is capturing one or more images of a subject during a video recording session. At 1501, in response to the detecting, the method comprises redirecting, with the one or more processors, one or more user interface controls operable at a user interface of the electronic device to a user interface of the wearable companion device.

At 1502, the method of 1501 further comprises receiving, after the redirecting, one or more video recording session control signals from the wearable companion device and controlling one or more control parameters of the video recording session as a function of the one or more video recording session control signals. At 1503, the one or more video recording session control signals of 1502 are initiated by actuation of at least one user interface control of the one or more user interface controls at the user interface of the wearable companion device. At 1504, the wearable companion device of 1502 comprises a smartwatch. At 1505, the one or more video recording session control signals of 1504 are initiated by a gesture translating the smartwatch in three-dimensional space.

At 1506, the method of 1501 further comprises determining, by the one or more processors using one or more sensors of the electronic device, whether user interaction with the one or more user interface controls at the user interface of the electronic device will at least partially obscure depictions the subject of the video recording session in the one or more images. At 1506, the redirecting the one or more user interface controls to the user interface of the wearable companion device occurs only when the user interaction with the one or more user interface controls at the user interface of the electronic device will at least partially obscure the subject of the video recording session in the one or more images.

At 1507, the method of 1501 further comprises determining, by the one or more processors, whether the image capture device and the user interface of the electronic device are situated on the same side of the electronic device. At 1507, the method further comprises precluding the redirecting the one or more user interface controls to the user interface of the wearable companion device occurs when the user interface of the electronic device and the image capture device are situated on opposite sides of the electronic device.

At 1508, the method of 1507 further comprises determining, using one or more sensors of the electronic device, a distance between an authorized user of the electronic device and the electronic device. At 1508, the precluding the redirecting the one or more user interface controls to the user interface of the wearable companion device occurs only when the distance is within a predefined threshold.

At 1509, the method of 1501 further comprises causing the user interface of the wearable companion device to present at least one image of the subject of the video recording session concurrently with the one or more user interface controls. At 1510, the one or more user interface controls of 1501 comprise one or more of a stop user actuation target, a play user actuation target, an audio control user actuation target, a rewind user actuation target, and/or a fast forward user actuation target.

At 1511, an electronic device comprises a communication device electronically communicating with both a content presentation companion device operating as a primary display for the electronic device and a wearable electronic device during a video recording session. AT 1511, the electronic device comprises an image capture device capturing one or more images of a subject of the video recording session. At 1511, the electronic device comprises one or more processors dynamically redirecting one or more video recording session controls operable at a user interface of the electronic device to a user interface of the wearable electronic device while the image capture device is capturing the one or more images of the subject of the video recording session.

At 1512, the electronic device of 1511 comprises a smartphone and the wearable electronic device comprises a smartwatch. At 1513, the one or more user interface controls of 1512 comprise one or more of a stop user actuation target, a play user actuation target, an audio control user actuation target, a rewind user actuation target, and/or a fast forward user actuation target.

At 1514, the communication device of 1512 receives signals indicating actuation of at least one video recording session control at the user interface of the smartwatch and the one or more processors control one or more control parameters of the video recording session in response to receiving the signals. At 1515, the communication device of 1512 receives signals indicating translation of the smartwatch in three-dimensional space in accordance with a predefined gesture and the one or more processors control one or more control parameters of the video recording session in response to receiving the signals.

At 1516, the electronic device of 1512 further comprises one or more sensors determining whether user interaction with the one or more video recording session controls at the user interface of the smartphone will at least partially obscure depictions of the subject of the video recording session in the one or more images. At 1516, the one or more processors of the electronic device dynamically redirect the one or more video recording session controls to the user interface of the smartwatch only when the user interaction with the one or more user interface controls at the user interface of the smartphone will at least partially obscure the depictions of the subject of the video recording session in the one or more images.

At 1517, a method in an electronic device comprises detecting, by one or more processors, the electronic device engaging in a video recording session while electronically in communication with both a companion electronic device operating as a primary display for the electronic device and a smartwatch. At 1517, the method comprises redirecting one or more video recording session controls to a user interface of the smartwatch when user interaction with the one or more video recording session controls at a user interface of the electronic device will at least partially obscure depictions of a subject of the video recording session in one or more video recording session images captured by an image capture device of the electronic device.

At 1518, the method of 1517 further comprises receiving, by a communication device of the electronic device, one or more video recording session control signals from the smartwatch and causing a video recording session output presented on the companion electronic device to change as a function of the one or more video recording session control signals. At 1519, the one or more video recording session control signals of 1518 indicate that a video recording session control presented on the user interface of the smartwatch has been touched. At 1520, the one or more video recording session control signals of 1518 indicate that the smartwatch has been translated in three-dimensional space in accordance with a predefined gesture.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method in an electronic device, the method comprising:
    detecting, with one or more processors, a communication device electronically in communication with both:
        a content presentation companion device operating as a primary display for the electronic device; and
        a wearable companion device;
    while:
        the content presentation companion device is operating as the primary display for the electronic device; and
        an image capture device of the electronic device is capturing one or more images of a subject during a video recording session; and
    in response to the detecting, redirecting, with the one or more processors, one or more user interface controls operable at a user interface of the electronic device to a user interface of the wearable companion device and
    further comprising determining, by the one or more processors, whether the image capture device and the user interface of the electronic device are situated on the same side of the electronic device, further comprising precluding the redirecting the one or more user interface controls to the user interface of the wearable companion device occurs when the user interface of the electronic device and the image capture device are situated on opposite sides of the electronic device.

2. The method of claim 1, further comprising receiving, after the redirecting, one or more video recording session control signals from the wearable companion device and controlling one or more control parameters of the video recording session as a function of the one or more video recording session control signals.

3. The method of claim 2, wherein the one or more video recording session control signals are initiated by actuation of at least one user interface control of the one or more user interface controls at the user interface of the wearable companion device.

4. The method of claim 2, wherein the wearable companion device comprises a smartwatch.

5. The method of claim 4, wherein the one or more video recording session control signals are initiated by a gesture translating the smartwatch in three-dimensional space.

6. The method of claim 1, further comprising determining, by the one or more processors using one or more sensors of the electronic device, whether user interaction with the one or more user interface controls at the user interface of the electronic device will at least partially obscure depictions the subject of the video recording session in the one or more images, wherein the redirecting the one or more user interface controls to the user interface of the wearable companion device occurs only when the user interaction with the one or more user interface controls at the user interface of the electronic device will at least partially obscure the subject of the video recording session in the one or more images.

7. The method of claim 1, the precluding resulting in the one or more user interface controls remaining active on the user interface of the electronic device.

8. The method of claim 1, further comprising determining, using one or more sensors of the electronic device, a distance between an authorized user of the electronic device and the electronic device, wherein the precluding the redirecting the one or more user interface controls to the user interface of the wearable companion device occurs only when the distance is within a predefined threshold.

9. The method of claim 1, further comprising causing the user interface of the wearable companion device to present at least one image of the subject of the video recording session concurrently with the one or more user interface controls.

10. The method of claim 1, wherein the one or more user interface controls comprise one or more of a stop user actuation target, a play user actuation target, an audio control user actuation target, a rewind user actuation target, and/or a fast forward user actuation target.

11. An electronic device, comprising:
- a communication device electronically communicating with both a content presentation companion device operating as a primary display for the electronic device and a wearable electronic device during a video recording session;
- an image capture device capturing one or more images of a subject of the video recording session; and
- one or more processors dynamically redirecting one or more video recording session controls operable at a user interface of the electronic device to a user interface of the wearable electronic device while the image capture device is capturing the one or more images of the subject of the video recording session; and
- further comprising determining, by the one or more processors using one or more sensors of the electronic device, whether user interaction with the one or more video recording session controls at the user interface of the electronic device will at least partially obscure depictions the subject of the video recording session in the one or more images, wherein the redirecting the one or more video recording session controls to the user interface of the wearable electronic device occurs only when the user interaction with the one or more video recording session controls at the user interface of the electronic device will at least partially obscure the subject of the video recording session in the one or more images.

12. The electronic device of claim 11, wherein the electronic device comprises a smartphone and the wearable electronic device comprises a smartwatch.

13. The electronic device of claim 12, wherein the one or more video recording session controls comprise one or more of a stop user actuation target, a play user actuation target, an audio control user actuation target, a rewind user actuation target, and/or a fast forward user actuation target.

14. The electronic device of claim 12, wherein the communication device receives signals indicating actuation of at least one video recording session control at the user interface of the smartwatch and the one or more processors control one or more control parameters of the video recording session in response to receiving the signals.

15. The electronic device of claim 12, wherein the communication device receives signals indicating translation of the smartwatch in three-dimensional space in accordance with a predefined gesture and the one or more processors control one or more control parameters of the video recording session in response to receiving the signals.

16. The electronic device of claim 12, wherein the one or more processors of the electronic device dynamically redirect the one or more video recording session controls to the user interface of the smartwatch only when both the user interaction with the one or more video recording session controls at the user interface of the smartphone will at least partially obscure the depictions of the subject of the video recording session in the one or more images and a distance between the smartphone and an authorized user of the smartphone is less than a predefined threshold.

17. A method for an electronic device, the method comprising:
- detecting, by one or more processors, the electronic device engaging in a video recording session while electronically in communication with both a companion electronic device operating as a primary display for the electronic device and a smartwatch; and
- redirecting one or more video recording session controls to a user interface of the smartwatch when user interaction with the one or more video recording session controls at a user interface of the electronic device will at least partially obscure depictions of a subject of the video recording session in one or more video recording session images captured by an image capture device of the electronic device.

18. The method of claim 17, further comprising receiving, by a communication device of the electronic device, one or more video recording session control signals from the smartwatch and causing a video recording session output presented on the companion electronic device to change as a function of the one or more video recording session control signals.

19. The method of claim 18, wherein the one or more video recording session control signals indicate that a video recording session control presented on the user interface of the smartwatch has been touched.

20. The method of claim 18, wherein the one or more video recording session control signals indicate that the smartwatch has been translated in three-dimensional space in accordance with a predefined gesture.

* * * * *